United States Patent [19]

Takashima

[11] Patent Number: 5,045,186

[45] Date of Patent: Sep. 3, 1991

[54] FILTRATION METHOD AND FILTER PRESS FOR EMPLOYING THE METHOD

[75] Inventor: Atsushi Takashima, Kobe, Japan

[73] Assignee: Kurita Machinery Manufacturing Company Limited, Osaka, Japan

[21] Appl. No.: 409,878

[22] Filed: Sep. 20, 1989

[30] Foreign Application Priority Data

Sep. 22, 1988 [JP] Japan .................................. 63-239426
Sep. 22, 1988 [JP] Japan .................................. 63-239427
May 1, 1989 [JP] Japan .................................. 61-113944
Jun. 30, 1989 [JP] Japan .................................. 1-170806

[51] Int. Cl.$^5$ .................... B01D 25/12; B01D 25/172; B01D 25/32
[52] U.S. Cl. ......................................... 210/90; 210/97; 210/138; 210/143; 210/225; 210/227; 210/230; 100/112; 100/113; 100/198
[58] Field of Search ................. 210/741, 770, 808, 90, 210/97, 143, 224, 225, 227, 228, 229, 230, 138; 100/110, 112, 113, 116, 193, 194, 196, 197, 198

[56] References Cited

U.S. PATENT DOCUMENTS

| | | | |
|---|---|---|---|
| 218,879 | 8/1879 | Hartshorn | 100/197 |
| 1,308,918 | 7/1919 | Schwable | 100/197 |
| 4,209,404 | 6/1980 | Yoshida | 210/225 |
| 4,219,425 | 8/1980 | Yoshida | 210/225 |
| 4,397,744 | 8/1983 | Haruo | 210/225 |
| 4,491,519 | 1/1985 | Kurita | 210/225 |
| 4,710,293 | 12/1987 | Davis | 210/225 |
| 4,855,062 | 8/1989 | Oelbermann | 210/741 |
| 4,861,494 | 8/1989 | Bratten | 210/741 |
| 4,874,512 | 10/1989 | Brown | 210/225 |
| 4,892,665 | 1/1990 | Wettlaufer | 210/225 |

FOREIGN PATENT DOCUMENTS

| | | |
|---|---|---|
| 0265794 | 5/1988 | European Pat. Off. |
| 656143 | 1/1938 | Fed. Rep. of Germany |
| 2504113 | 10/1982 | France |
| 64-85200 | 3/1989 | Japan |

Primary Examiner—W. Gary Jones
Attorney, Agent, or Firm—Wenderoth, Lind & Ponack

[57] ABSTRACT

A filtration method includes steps of feeding liquid to be filtered into a filter medium between a fixed plate and a movable plate; and reducing capacity of a filter chamber formed by the medium by moving the movable plate in a direction in which the movable plate presses the fixed plate through the medium so as to perform expressing filtration of the liquid and to produce cake. The reducing step comprises alternately repeating at least one time an expressing pressure-increasing process for increasing pressure in the liquid in the medium by a specified increment in the filtration of the liquid, and an expressing pressure-maintaining process for maintaining the pressure constant during a specified period, so that the filtration is performed under a specified pressure corresponding to a desired water content of the cake to produce the cake. A filter press for employing the method has the filter medium arranged between the fixed plate and the movable plate capable of moving toward and away from the fixed plate. The press comprises a driving device for driving the movable plate to move toward and away from the fixed plate; a pressure sensor arranged at one of the movable plate and the fixed plate and measuring pressure in the chamber; and a control unit for controlling the expressing filtration of the liquid by control of drive of the driving device on the basis of a signal outputted from the sensor.

5 Claims, 17 Drawing Sheets

FILTRATION METHOD AND FILTER PRESS FOR EMPLOYING THE METHOD

BACKGROUND OF THE INVENTION

This invention relates to a filtration method and a filter press for employing the method, and more particularly, to a filter press in which the lower opening of a tubular filter medium is closed so that the medium may be formed into a sack before liquid to be filtered is fed into the medium through the upper opening thereof, and the capacity of a filter chamber formed in the medium is reduced, with the result that the expressing filtration of the liquid is performed to produce a cake with a desired water content in the chamber.

Conventionally, there has been proposed a filter press in which a pair of filter cloths are arranged between adjacent filter plates and a filter chamber is formed between the pair of the cloths arranged between filter beds of the adjacent plates in closing the plates so that liquid to be filtered may be fed into the chamber for filtration.

However, in the arrangement thereof, the filtration area is kept constant due to the size of a gap between the beds of the adjacent plates and the configuration of the chamber is limited by that of the gap, resulting in a small degree of freedom of the cloth to fluctuate in configuration with respect to the cake.

Then, for example, there has been proposed a filter press in which after the lower opening of a tubular filter medium is closed, liquid to be filtered is fed into the medium through the upper opening thereof to filter the liquid, and after completion of the filtration, the lower opening of the medium is opened to discharge the cake from the medium.

However, in the construction thereof, since the lower opening of the medium is only opened in discharging cake, cake attached to the medium can not be discharged from the medium. In order to remedy the problem, it is possible to consider that the medium is subjected to vibration by a manual operation. However, the operation is troublesome and it is difficult to give the vibration to the whole medium in a large filter press.

On the other hand, there has been proposed a filter press, as an expressing type filter press, in which expressing type filter plates having pressing diaphragms and filter plates without pressing diaphragms are alternately arranged between a front and a rear stand serving as fixed plates to be capable of moving backward and forward therebetween. A pair of filter cloths are arranged between the expressing type filter plate and the filter plate which does not have the diaphragm adjacent thereto, the plates being moved toward the front stand by a movable plate under pressure to form a filter chamber defined between the pair of the cloths arranged between the adjacent plates so as to feed liquid to be filtered into the chamber for filtration.

In this filter press, in the case where the movable plate is driven for expressing filtration, the movable plate continues to be driven for the expressing filtration until the pressure caused by the movable plate reaches a specified expressing pressure. Therefore, it may be impossible to sufficiently perform the filtration of liquids having certain characteristics. For example, in the case where a liquid to be filtered (including fruit, etc.) is expressed, since cake in the liquid, that is, the peel of the fruit, adheres to the inner surface of the cloths to form a film, cake with a desired water content can not be obtained even under high expressing pressures. Moreover, in a filter press employing a pressing diaphragm, since the diaphragm is normally made of rubber, the rubber diaphragm can not be used for filtration of corrosive liquids to be filtered which corrode rubber and should be replaced with a corrosion-resistant diaphragm. However, the corrosion-resistant diaphragm has small strength, with the result that it is very difficult to obtain cake with a desired water content from the corrosive liquid. Furthermore, in the filter press employing the diaphragm, the control of the water content of the cake is not performed on the basis of the directly measured expressing pressure in the chamber but is performed on the basis of the pressure of the compressed air for expanding the diaphragm, with the result that the control is indirectly performed. Therefore, the difference between the pressure of the air and the actual expressing pressure becomes larger.

SUMMARY OF THE INVENTION

Accordingly, an essential object of the present invention is to remedy the above-described disadvantages and to provide a filter medium which may prevent the filtration area from being limited by any member and which may assume any configuration, resulting in a large degree of freedom of the medium to fluctuate in configuration with respect to cake.

Another important object of the present invention is to provide a filter press capable of smoothly discharging cake from a filter medium.

A further object of the present invention is to provide a filtration method and a filter press for employing the method which may perform expressing filtration of any liquid to be filtered notwithstanding the characteristics thereof and which may more accurately obtain a cake having a desired water content.

In accomplishing these and other objects, according to one preferred embodiment of the present invention, there is provided a filtration method of a filter press having a filter medium arranged between a fixed plate and a movable plate capable of approaching and moving away from the fixed plate, comprising the steps of:

feeding liquid to be filtered into a filter chamber with respect to the fixed plate; and reducing capacity of the chamber by moving the movable plate in a direction in which the movable plate presses against the fixed plate through the medium so as to perform expressing filtration of the liquid and to produce cake with a desired water content;

the reducing step comprising the step of alternately repeating at least one time an expressing pressure increasing process for increasing expressing pressure in the liquid in the chamber by a specified increment in the expressing filtration of the liquid and an expressing pressure maintaining process for maintaining the pressure constant during a specified period.

In another aspect of the present invention, a filter press comprises:

a fixed plate;

a movable plate capable of moving toward and away from the fixed plate;

a filter medium arranged between the fixed plate and the movable plate;

a liquid feed means for feeding liquid to be filtered into a filter chamber formed by the medium at a specified position of the movable plate with respect to the fixed plate;

a driving means for driving the movable plate to move toward and away from the fixed plate, a capacity of the chamber being reduced by moving the movable plate in a direction in which the movable plate presses against the fixed plate through the medium by driving of the driving means so as to perform expressing filtration of the liquid and to produce cake with a desired water content;

a pressure sensor arranged at one of the movable plate and the fixed plate for measuring expressing pressure in the chamber; and a control unit for controlling the expressing filtration of the liquid by controlling drive of the driving means on the basis of a signal outputted from the sensor, the unit comprising:

a drive start means for starting to drive the driving means to move the movable plate in a direction in which the movable plate presses against the fixed plate to start an expressing pressure-increasing process for increasing the pressure in the liquid in the chamber by a specified increment;

a first judging means for detecting an increase in the pressure by the increment during the increasing process;

a stop means for stopping drive of the driving means when it is judged by the first judging means that the pressure has increased by the increment;

a timer means for measuring a first specified period in an expressing pressure-maintaining process for maintaining the pressure constant, after completion of the increasing process;

a second judging means for detecting an increase to a specified value, corresponding to the desired water content of the cake, in the pressure after either of the two processes have been completed;

a drive restart means for restarting the driving means so as to restart the increasing process after the maintaining process when it is judged by the second judging means that the pressure has not reached the specified value; and a stop means for terminating the expressing filtration when it is judged by the second judging means that the pressure has reached the specified value, after the increasing process and the maintaining process have been performed at least one time.

In a further aspect of the present invention, a filter press comprises a filter press comprising:

a fixed plate;

plural movable plates capable of moving toward and away from the fixed plate;

a filter medium comprising a pair of filter cloths and being arranged between the adjacent movable plates, a recess portion being formed in one of the adjacent confronting surfaces of the movable plates, and a projection portion being formed on the other of the surfaces thereof, the projection portion being fitted into the recess portion to close an opening of the recess portion so as to cause the cloths to form a filter chamber therebetween;

a liquid feed means for feeding liquid to be filtered into the chamber formed by the medium at specified positions of the movable plates with respect to the fixed plate;

a driving means for driving the movable plates to move toward and away from the fixed plate, the capacity of each chamber being reduced by moving the movable plates in a direction in which each of the movable plates presses against the fixed plate through the medium by driving of the driving means so as to perform expressing filtration of the liquid and to produce cake with a desired water content;

a pressure sensor arranged at one of the movable plates for measuring expressing pressure in one of the chambers; and a control unit for controlling the expressing filtration of the liquid by controlling the driving means on the basis of a signal outputted from the sensor, the unit comprising:

a drive start means for starting the driving means to move the movable plates in a direction in which each of the movable plates presses against the fixed plate to start an expressing pressure-increasing process for increasing the pressure in the liquid in the chamber by a specified increment;

a first judging means for detecting an increase in the pressure by the increment in the increasing process;

a stop means for stopping the driving means when it is judged by the first judging means that the pressure has increased by the increment;

a timer means for measuring a first specified period in an expressing pressure-maintaining process for maintaining the pressure constant, after completion of the increasing process;

a second judging means for detecting an increase to a specified value, corresponding to the desired water content of the cake, in the pressure after either of the two processes;

a drive restart means for restarting the driving means so as to restart the increasing process after the maintaining process when it is judged by the second judging means that the pressure has not reached the specified value; and a stop means for terminating the expressing filtration when it is judged by the second judging means that the pressure has reached the specified value, after the increasing process and the maintaining process are performed at least one time.

In a still another aspect of the present invention, a filter press comprises:

a tubular filter medium;

a support member for supporting the medium by hanging;

a vibrating member through which the medium is connected with the support member and held in a state where the medium is stretched, by which the medium is subjected to vibration during discharging of the cake from the medium; and a first close member for closing a lower opening of the medium to form a sack-like filter chamber so as to feed liquid to be filtered into the chamber, and opening the lower opening of the medium so as to discharge cake in the medium after filtration.

In a further aspect of the present invention, a filter press comprises:

a pair of filter cloths;

a support member for supporting the cloths by hanging; and a vibrating member through which each of the cloths is connected with the support member to be held in a state where each of the cloths is stretched, by which each of the cloths is subjected to vibration during discharging of the cake from each of the cloths.

In still another aspect of the present invention, a filter medium comprises a tubular filter medium body and a connecting member from which the body is hung and is capable of being subjected to vibration, a lower opening of the body being closed to form a sack-like filter chamber and the opening thereof being opened during discharging of the cake in the chamber, the connecting member being attached to a specified portion of the body.

By the filtration method according to the present invention, when the expressing filtration of the liquid is performed, the expressing pressure-increasing process for increasing the pressure by the specified increment and the expressing pressure-maintaining process for maintaining the pressure constant are alternately performed at least one time. Thus, a cake with the desired water content is produced in the chamber. Therefore, since in correspondence with the characteristics of the liquid to be filtered, the press may produce a gradual increase in the expressing pressure rather than an abrupt increase, the expressing filtration of any liquid to be filtered may be performed without having cake adhere to the inner surface of the medium which causes disturbance of the expressing filtration. That is, the expressing filtration of a liquid with normally troublesome characteristics may be performed by producing a gradual increase in the pressure, while the expressing filtration of the liquid with normally non-troublesome characteristics may be performed by producing an abrupt increase or a gradual increase in the pressure. Then, the characteristics of liquids capable of being filtered are not limited.

According to the arrangements of the filter press of the present invention, it is not required to provide it with a pressing diaphragm as required in the conventional filter presses, with the result that the expressing filtration of liquid corroding rubber may be performed by directly pressing the liquid between the movable plate and the fixed plate through a medium such as a tubular member or a pair of filter cloths.

Furthermore, in the presses according to the present invention, the expressing pressure in the chamber is directly measured by the pressure sensor and the control of the expressing filtration of the liquid is performed by the unit on the basis of the measured pressure value. Then, the expressing pressure may be correctly increased to the specified value, as compared with the conventional filter presses in which the expressing filtration of the liquid is performed by controlling the compressed air of the pressing diaphragm. Therefore, the desired water content of the cake produced is more accurate.

By the above arrangements of the present invention, since the filter chamber is formed in the body of the tubular filter medium, the filtration area and the configuration of the chamber may not limited by any member such as a filter plate, as compared with a filter chamber formed between a pair of filter cloths arranged between adjacent filter plates. Therefore, the medium may change into any configuration in correspondence with the amount of the cake, resulting in a large degree of the freedom of the medium to fluctuation in configuration with respect to the cake. The whole area of the chamber constructed by the tubular medium is an available filtration area. Therefore, the filtration efficiency of the press is greatly improved as compared with that of the filter press having filter plates. Since the medium is hung from the support member through the connecting member and is subjected to vibration by the vibrating member, the whole medium may be readily and effectively subjected to the vibration so as to easily discharge the cake of the medium therefrom.

By the arrangements of the present invention, since the medium is subjected to the vibration by the vibrating member in discharging the cake, the cake adhering to the medium may be smoothly discharged from the medium, resulting in improved efficiency for discharging the cake.

Moreover, in the press according to the present invention having the push member, the cake in medium may be expressed by the push member, with the result that the filtration efficiency of the liquid may be improved.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
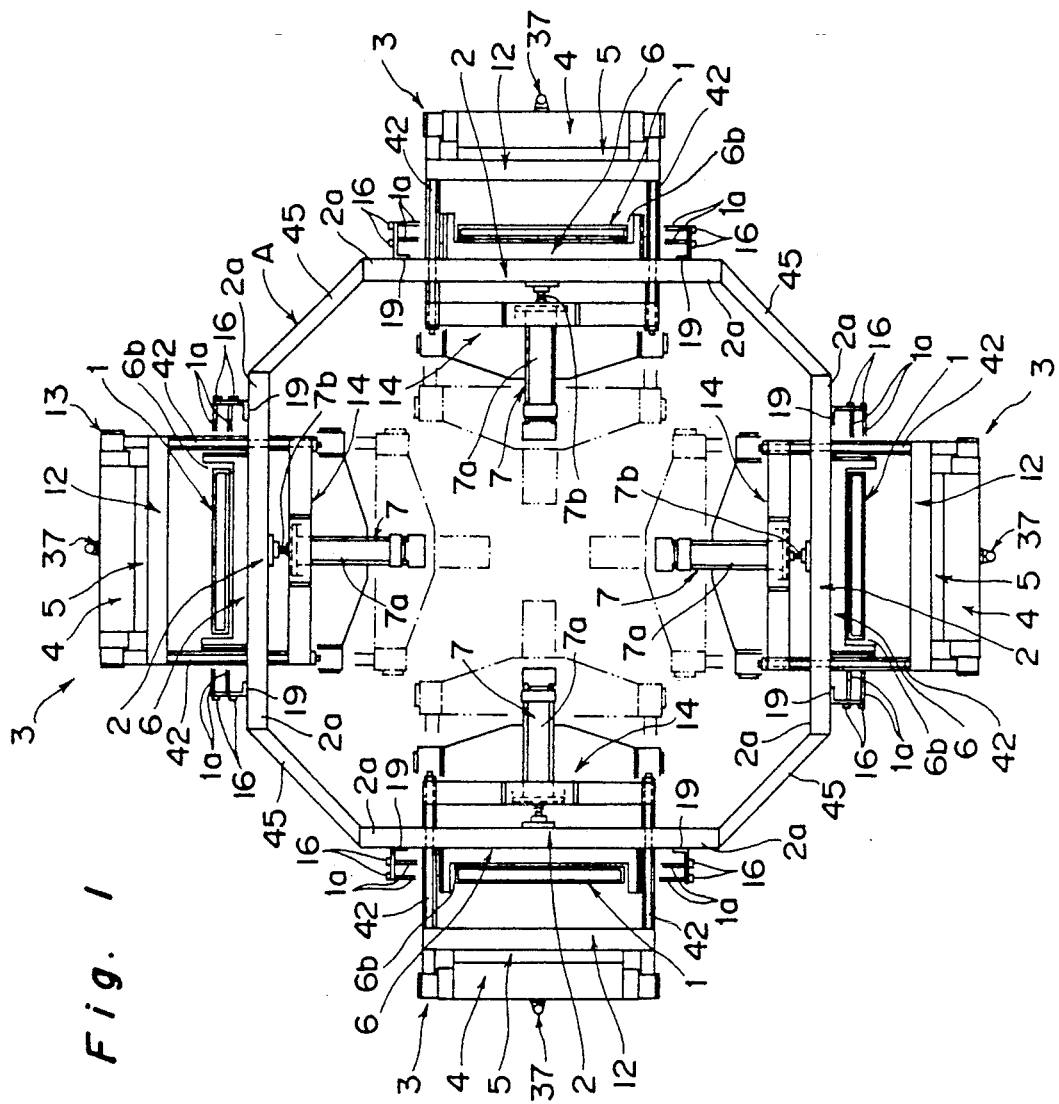
FIG. 1 is a plan view of a plural filter press device according to the one preferred embodiment of the present invention.

Before the description of the present invention proceeds, it is to be noted that like parts are designated by like reference numerals throughout the accompanying drawings.

Figure 2:
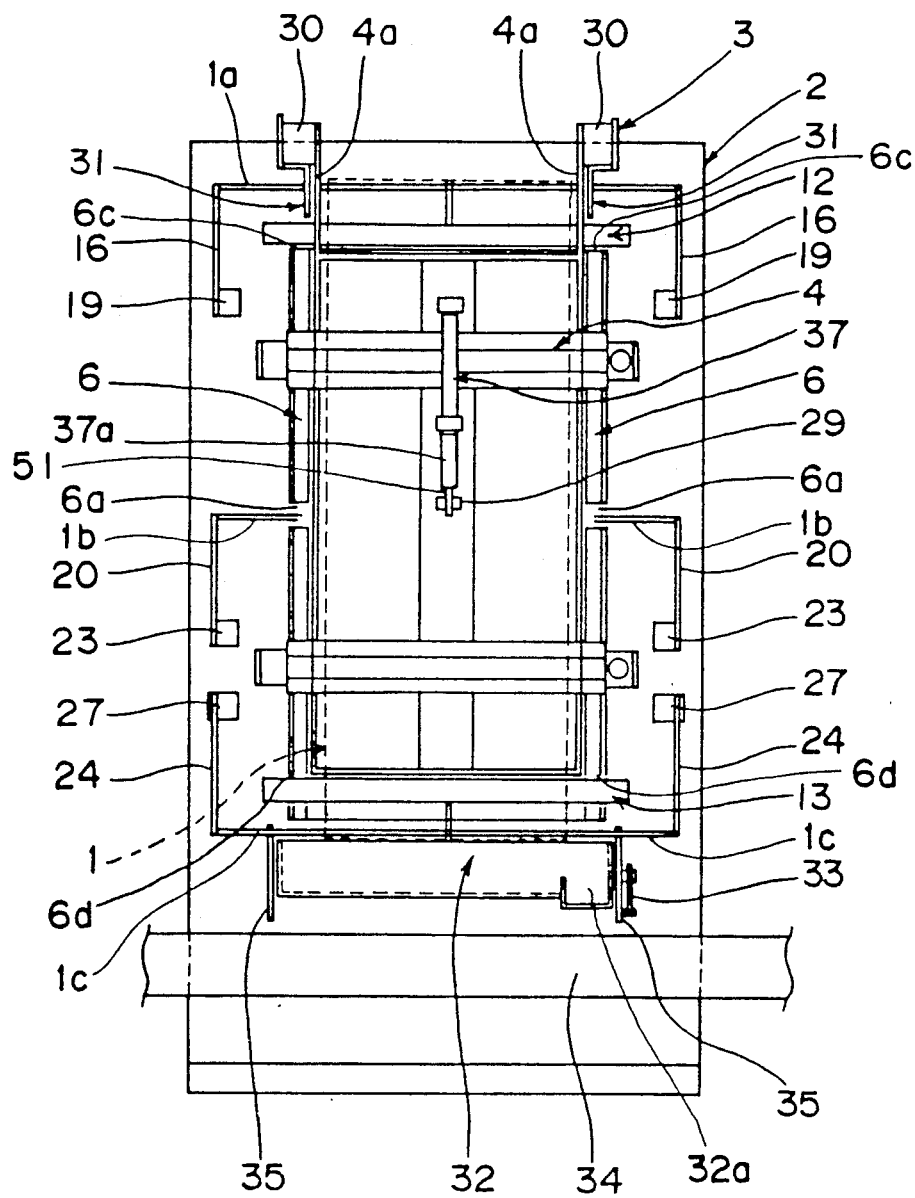
FIG. 2 is a front view of one of the filter presses shown in FIG. 1.
Figure 3:
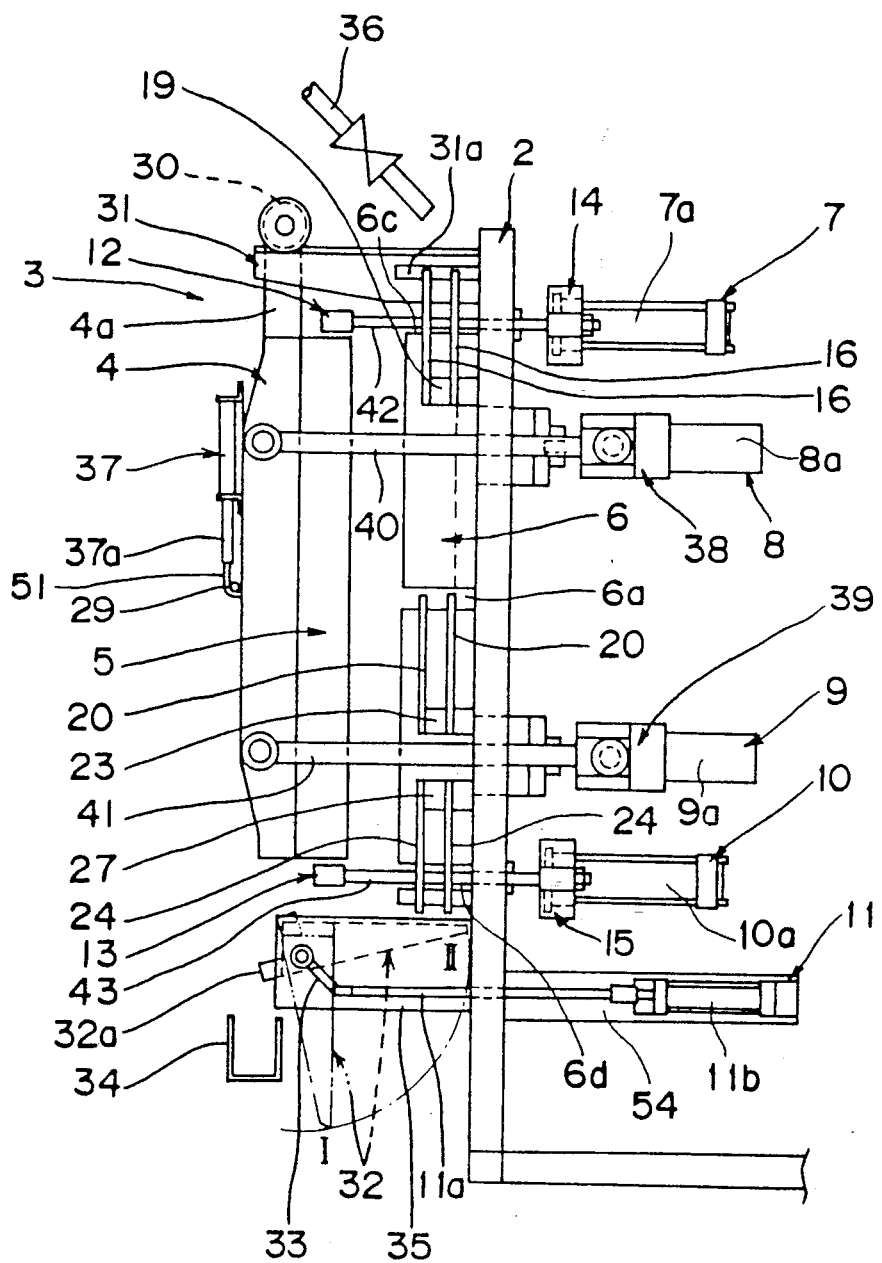
FIG. 3 is a right side view of the press shown in FIG. 2.

As shown in FIGS. 1-3, a filter press 3 is generally constructed such that it includes a plurality of support frames 2 and a plurality of movable plates 4 respectively supported by the frames 2 for movement in a support frame thickness direction (i.e. toward and away from the support frames, respectively). Between each frame 2 and corresponding plate 4, a tubular filter medium 1 is supported by twelve flat springs 16, 20, and 24 fixed to the frame 2 and serving as hanging support members and a fixed plate. The movable plate 4 is moved in the frame thickness direction by driving two press cylinders 8 and 9 each supported by the frame 2. A lower opening and an upper opening of the medium 1 are respectively closed and opened by a first close cylinder 10 and a second close cylinder 7, which are supported by the frame 2. After the lower opening of the medium 1 is closed to form a filter chamber, liquid to be filtered is fed into the medium 1 through the upper opening thereof by employing a liquid feed device. After that, the upper opening of the medium 1 is closed and then the medium 1 accommodating liquid therein is expressed between the movable plate 4 and the frame 2. After the expressing filtration, the lower opening of the medium 1 is opened so as to discharge cake 49 from the medium 1 downward while the medium 1 is subjected to vibration by a vibrating member.

Figure 6:
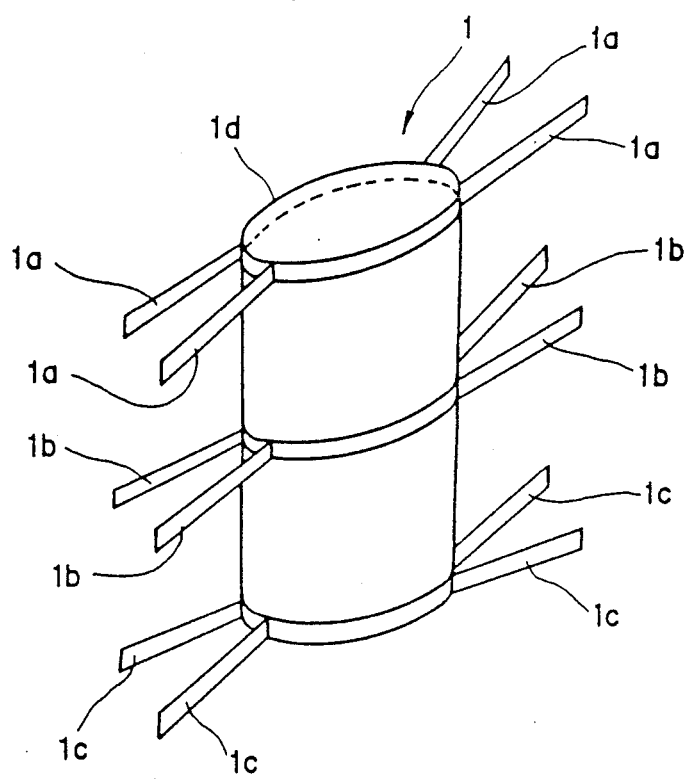
FIG. 6 is a perspective view of a filter medium arranged in the press.

The body 1d of the medium 1 is so constructed that both the longitudinal side ends of the approximate rectangular cloth made of polypropylene fiber are sewn to each other to form an approximate cylindrical figuration shown in FIG. 6. Four support strips are integrally sewn to the outer surfaces of the upper end, the lower end, and the middle of the medium 1 in FIG. 6, so that two strips are arranged adjacently and two pairs of the strips confront with each other with respect to a longitudinal axial direction of the body 1d of the medium 1. The body 1d thereof is supported hanging with the twelve flat springs 16, 20, and 24 through the twelve strips 1a, 1b, and 1c serving as connecting members. The construction elements such as the material and the thickness of the fiber for constructing the body 1d and the size of the mesh of the body 1d are suitably defined in accordance with the characteristics of the liquid. Therefore, the material of the fiber thereof may be synthetic resin, cotton, etc. The body 1d may be so constructed that a reinforcing cloth is attached to the rear face of a synthetic resin sheet and numerous small holes are bored in the cloth to use like a cloth. The size of the holes may be desirably adjusted in accordance with the characteristics of the liquid.

Figure 5:
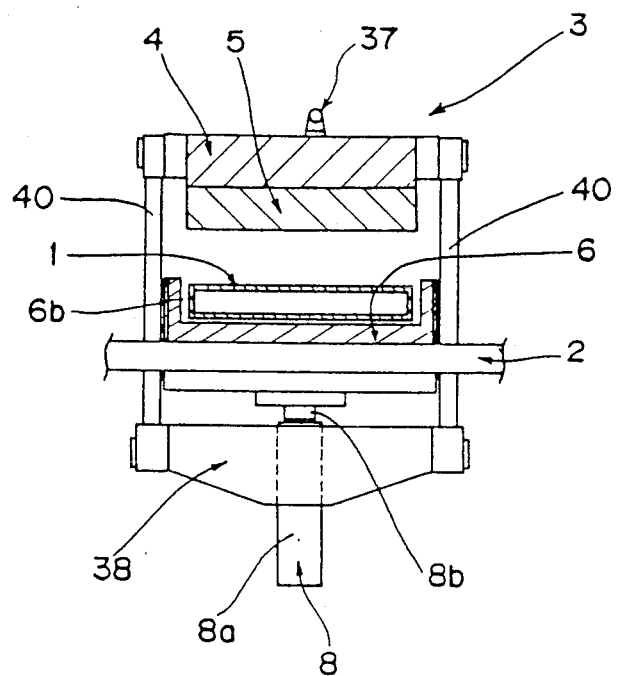
FIG. 5 is a cross sectional view taken along line V—V in FIG. 4.

As shown in FIG. 3, between the frame 2 and the movable plate 4, a pair of push plates 5 and 6 for pressing and holding the medium 1 in the frame thickness direction during the expressing filtration while the medium 1 is held between the push plates 5 and 6. The first push plate 5 has approximate uniform thickness as a whole as compared with the second push plate 6 and is fixed to the movable plate 4. The second push plate 6 is fixed to the frame 2 and has approximate U-shaped cross-section as shown in FIG. 5. The second push plate 6 is wider (i.e. from right to left in FIG. 5) than the first push plate 5. In the expressing filtration, the first push plate 5 presses the medium 1 toward the second push plate 6. Then, the first push plate 5 is fitted together with the medium 1 into a recess 6b formed between projecting portions of the second push plate 6 which are considerably projected from the front surface of the second push plate 6 in FIG. 5.

Cutouts 6c are formed at the right and left upper ends of the second push plate 6 in FIG. 2 to receive a second close plate 12 (described later) therethrough so as to allow closing of the upper opening of the medium 1 with the second close plate 12. At the right and left ends of the middle of the second push plate 6 in FIG. 2, cutouts 6a are formed to allow for connection of the strips 1b of the middle of the medium 1 with the flat springs 20, respectively. Cutouts 6d are formed at the right and left lower ends of the second push plate 6 in FIG. 2 to receive a first close plate 13 described later therethrough so as to be capable of closing the lower opening of the medium 1 by the first close plate 13.

The pairs of the flat springs 16, 20, and 24 are adjacently fixed to plates 19, 23, and 27 projected from the frame 2 at three locations, spaced along the longitudinal direction thereof, at the right and left ends of the frame 2 in FIG. 2. All the springs 16, 20, and 24 serve as hanging support elements for hanging the medium 1. A wire 51 is connected with a cylinder 37 through a small cylinder (not shown).

The pairs of the strips 1a, 1b, and 1c sewn to the medium 1 along the longitudinal direction at the right end of the medium 1 in FIG. 6 are respectively connected with the pairs of the flat springs 16, 20, and 24 arranged along the longitudinal direction of the frame 2 in FIG. 2, as follows. That is, the pair of the strips 1a arranged in parallel and sewn to the right upper end of the medium 1 in FIG. 6 pass through slots 31a formed on rails 31 described later and projected from the right upper end of the frame 2 in FIG. 2. The pair of the strips 1b arranged in parallel and sewn to the right middle of the medium 1 in FIG. 6 pass through the cutouts 6a formed in the second push plate 6 to be connected with the pair of the flat springs 20 arranged at the right middle of the frame 2 in FIG. 2. The pair of the strips 1c arranged in parallel and sewn to the right lower end of the medium 1 in FIG. 6 are connected with the pair of the flat springs 24 arranged at the right lower end of the frame 2 in the FIG. 2.

Each pair of the strips 1a, 1a; 1b, 1b; and 1c, 1c sewn to the medium 1 along the longitudinal direction of the left side of the medium 1 in FIG. 6 is similarly connected with each pair of the flat springs 16, 16; 20, 20; and 24, 24 arranged along the longitudinal direction of the left end side of the frame 2 in FIG. 2.

Thus, as shown in FIGS. 1 and 5, the medium 1 is supported in the recess 6b of the second push plate 6 to form an approximate rectangular frame-like cross-section.

As shown in FIGS. 7-13, the one end of the wire 51 is connected with a piston rod 37a of the vibrating cylinder 37 which is fixed to the front surface of the movable plate 4, and the other end of the wire 51 is connected with the approximate middle of the surface, confronting with the first push plate 5, of the medium 1 through a roller 29 supported rotatably by the movable plate 4 and through holes 4b and 5a each formed on the movable plate 4 and the first push plate 5.

Figure 4:
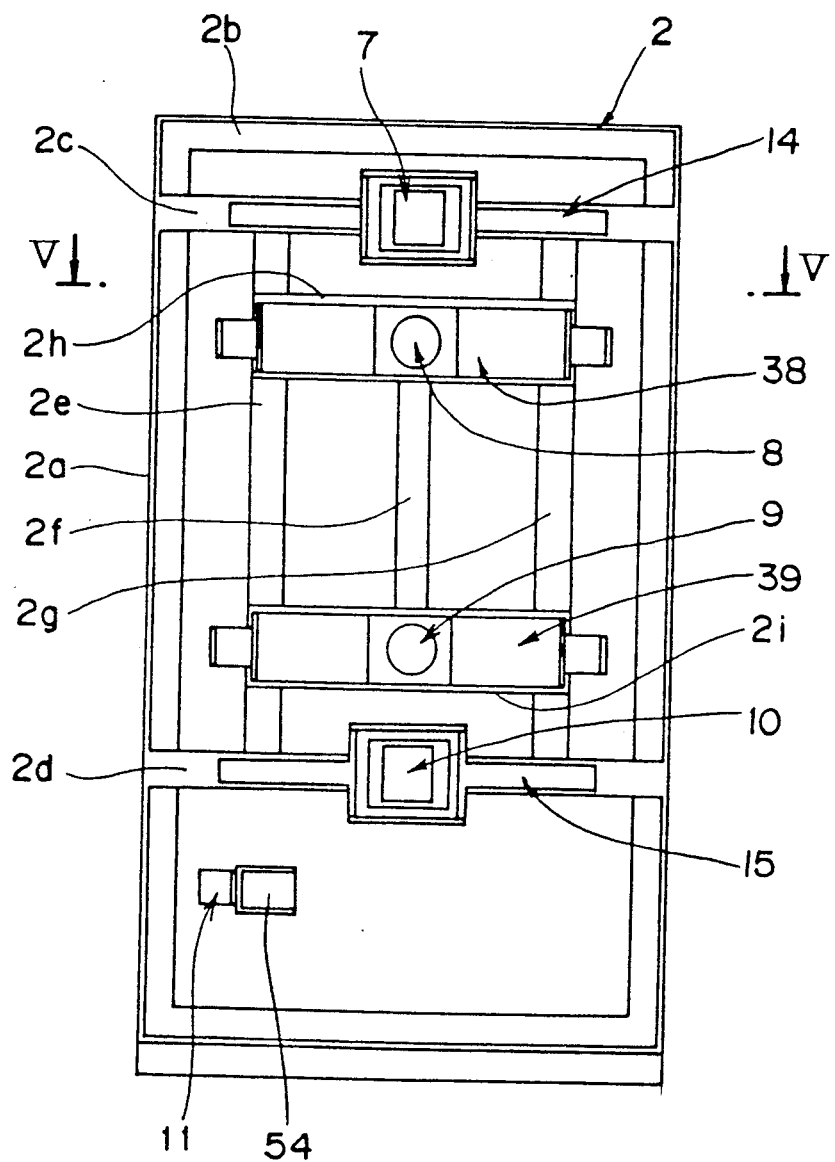
FIG. 4 is a rear view of the press shown in FIG. 2.

The piston rod (not shown) of the first close cylinder 10 is fixed to a second cross plate 2d of the frame 2. The cylinder body 10a of the first close cylinder 10 is fixed to a first movable frame 15 so as to be capable of moving in right and left direction in FIG. 3. Each of the right and left ends of the frame 15 in FIG. 4 is connected with one end of a respective one of the first connecting rods 43 of the pair of rods 43 penetrating the second cross plate 2d so that the rods 43 may move in the second cross plate thickness direction. The other end of each of the pair of the rods 43 is connected with the first close plate 13 for closing the lower opening of the medium 1, so that the plate 13 is driven by the drive of the first close cylinder 10. As shown in FIGS. 7-13, an approximate V-shaped vertical-section recess 13a is formed between the pair of the first connecting rods 43 and on the surface, confronting with the second push plate 6, of the first close plate 13. Corresponding to the recess 13a, an approximate V-shaped vertical-section projection 47 is formed at a portion, confronting with the recess 13a, of the second push plate 6. When the lower opening of the medium 1 is closed by the first close plate 13, the recess 13a is fitted on the projection 47 while the lower end of the medium 1 is held therebetween. Then, the first close cylinder 10, the pair of the connecting rods 43, and the first close plate 13 serve as the first close member.

As shown in FIGS. 7-13, rods 52 are respectively fixed to the lower surfaces of both longitudinal ends of the first close plate 13, so that the rods 52 respectively catch the middles of the two support strips 1c arranged at the side of the first push plate 5 in four strips at the lower end of the medium 1 during the expressing filtration.

The piston rod 7b (refer to FIG. 1) of the second close cylinder 7 is fixed to a first cross plate 2c of the frame 2. The cylinder body 7a of the second close cylinder 7 is fixed to a second movable frame 14 so as to be capable of moving in the right and left directions in FIG. 3. Each of the right and left ends of the second movable frame 14 in FIG. 4 is connected with each one end of each of a pair of second connecting rods 42 and 42 penetrating the first cross plate 2c so that the rods 42 may more in the cross first plate thickness direction. Each of the other ends of the rods 42 is connected with the second close plate 12 for closing the upper opening of the medium 1, so that the second close plate 12 is driven by the drive of the second close cylinder 7. As shown in FIGS. 7-13, an approximate V-shaped vertical-section recess 12a is formed between the pair of the second connecting rods 42 and on the surface, confronting with the second push plate 6, of the second close plate 12. Corresponding to the recess 12a of the second push plate 6, an approximate V-shaped vertical-section projection 50 is formed at a portion, confronting with the recess 12a, of the second push plate 6. When the upper opening of the medium 1 is closed by the second close plate 12, the recess 12a is fitted on the projection 50 while the upper end of the medium 1 is held therebetween. Then, the second close cylinder 7, the rods 42 and the second close plate 12 serve as the second close member.

As shown in FIGS. 7-13, rods 53 are respectively fixed to the upper surfaces of both the longitudinal ends of the second close plate 12, so that the rods 53 respectively catch the middles of the two support strips 1a and 1a arranged at the side of the first push plate 5 in the four strips at the upper end of the medium 1 during the expressing filtration.

The piston rod (not shown) of the first press cylinder 9 which is located above the first close cylinder 10 is fixed to a fourth cross plate 2i of the frame 2. The cylinder body 9a of the first press cylinder 9 is fixed to a third movable frame 39 so as to be capable of moving in the right and left directions in FIG. 3. Each of the right and left ends of the third movable frame 39 in FIG. 4 is connected with each one end of a pair of third connecting rods 41 penetrating the fourth cross plate 2i so that the rods 41 may move in the fourth cross plate thickness direction. Each of the other ends of the rods 41 is connected with the movable plate 4 in the vicinity of the lower end.

As is clear from FIG. 5, the piston rod 8b of the second press cylinder 8 which is located below the second close cylinder 7 is fixed to a third cross plate 2h of the frame 2. The cylinder body 8a of the second press cylinder 8 is fixed to a fourth movable frame 38 so as to be capable of moving in the right and left directions in FIG. 3. Each of the right and left ends of the fourth movable frame 38 in FIG. 4 is connected with each one end of a pair of fourth connecting rods 40 penetrating the third cross plate 2h so that the rods 40 may move in the third cross plate thickness direction. Each of the other ends of the rods 40 is connected with the movable plate 4 in the vicinity of the upper end thereof. The press cylinders 8 and 9, and the rods 40 and 41 serve as the driving means.

Therefore, by driving the first press cylinder 9 and the second press cylinder 8 simultaneously, the movable plate 4 is driven in the right and left directions in FIG. 3.

The pair of the approximately inverted L-shaped vertical-section rails 31 are arranged to project from the frame 2 at the vicinity of the right and left upper ends of the front surface of the frame 2 in FIG. 2 while approximately the same distance as the width of the movable plate 4 is held therebetween. On the other hand, a pair of arms 4a for hanging the movable plate 4 with the pair of the rails 31 are projected from the right and left upper ends of the movable plate 4 in FIG. 2. Rollers 30 are rotatably supported at the upper ends of the arms 4a respectively. By placing each roller 30 on the horizontal part of each rail 31, the movable plate 4 is hung on the rails 31 and is capable of moving in the right and left directions in FIG. 3. The slots 31a are formed in the vertical part of the rails 31, so that the four strips 1a sewn to the upper end of the medium 1 are passed through the slots 31a to be capable of connecting with the four flat springs 16, respectively.

As approximately triangular vertical section filtrate receiving pan 32 for receiving filtrate dropped from the medium 1 during the filtration is rotatably supported just under the second push plate 6 and at the front side of the frame 2 by a pair of approximately rectangular projecting plates 35 projected from the frame 3. A cylinder 11 for rotating the filtrate receiving pan 32 is located approximately on the opposite side to the pan 32 with respect to the frame 2. The cylinder body 11b of the cylinder 11 is fixed to an approximately C-shaped vertical-section bracket 54 fixed to the frame 2. The piston rod 11a of the cylinder 11 penetrates the frame 2 so as to be capable of moving in the right and left directions in FIG. 3. The distal end of the rod 11a thereof is connected to the other end of a connecting arm 33 of which one end is fixed to the pan 32, so that the arm 33 is capable of moving with respect to the rod 11a thereof. Therefore, by driving the cylinder 11, the pan 32 can be positioned at a filtrate-receiving position II shown by a broken line in FIG. 3 for receiving the filtrate or can be positioned at a retracting position I shown by phantom lines in FIG. 3 in discharging the cake 39 so as to retract from under the medium 1. The bottom surface of the pan 32 when positioned at the position II for receiving the filtrate is arranged so as to incline toward the left lower corner of FIG. 3. Thus, the filtrate received by and held in the pan 32 is discharged through a discharging opening 32a formed at the left lower end of the pan 32 in FIG. 3 and is dropped into a trough 34 arranged at the lower front of the frame 2 for collection.

As shown in FIG. 3, a liquid feed pipe 36 connected with the liquid feed device is arranged at the upper front of the frame 2 and by controlling a feed control valve, the liquid to be filtered can be fed into the filter chamber of the medium 1 through the upper opening thereof. The liquid to be filtered may be any one of various kinds of liquid such as liquid including solid content of about 0.1–2.0% or liquid including more than several percent solid content which is suitable for filtration with a filter press, etc.

In the embodiment, the four filter presses 3 are arranged as shown in FIG. 1. Then, all the presses 3 may be simultaneously operated or each press 3 may be selectively operated. In each press 3, the following filtration operation is performed.

Figure 7:
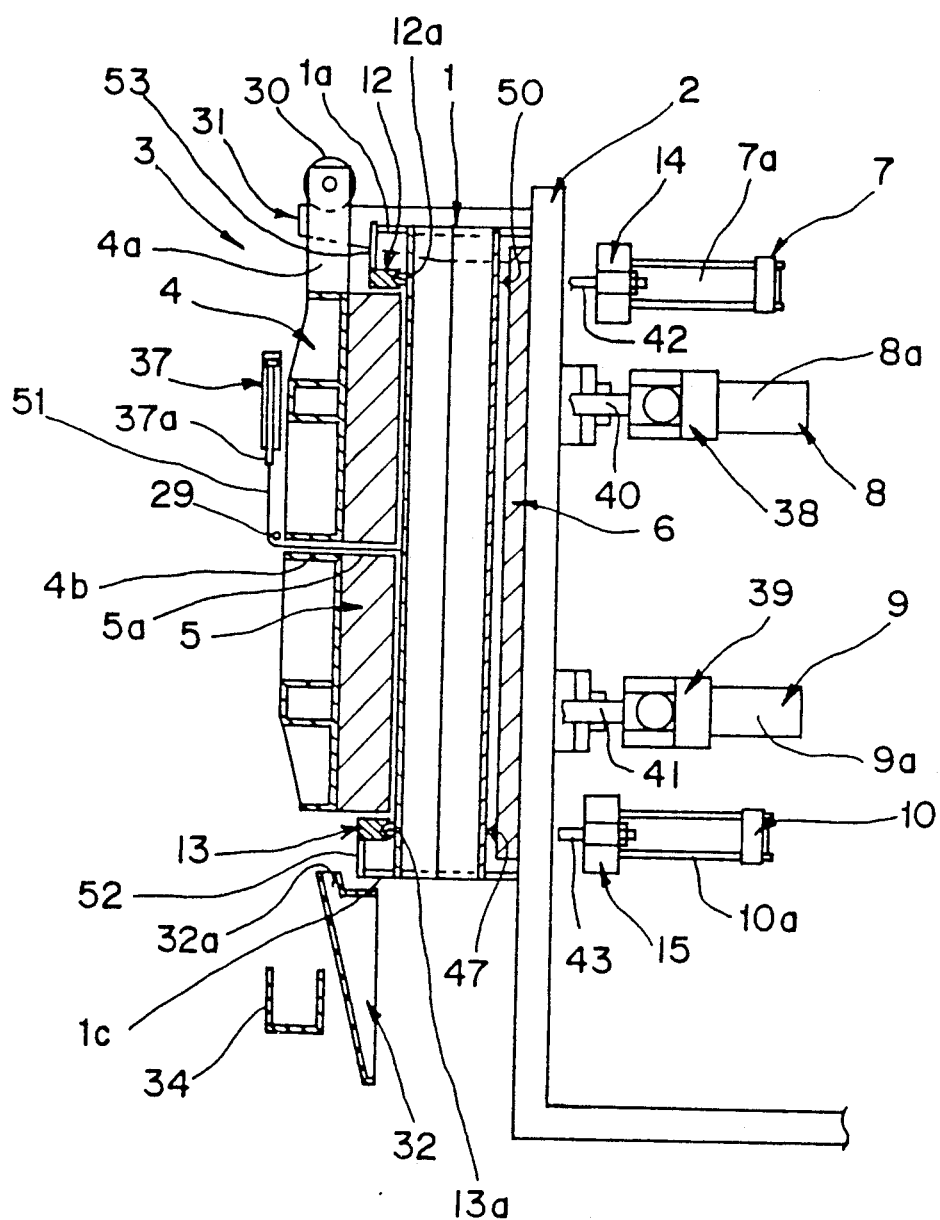
FIGS. 7-13 are partial sectional side view showing operation conditions of the press.

That is, firstly, each of the strips 1a, 1b, and 1c of the medium 1 is supported hanging from each of the flat springs 16, 20, and 24. As shown in FIG. 7, the pairs of the strips 1a and 1c sewn to the upper end and the lower end of the surface, confronting with the first push plate 5, of the medium 1 are respectively caught by the rods 52 and 53 which are fixed to the first and second close plates 12 and 13. The piston rod 37a of the vibrating cylinder 37 is moved upward in FIG. 7, so that the approximate center portion f the surface, confronting with the first push plate 5, of the medium 1 is pulled toward the first push plate 5 by the wire 51, with the result that the medium 1 is supported hanging between the first and second push plates 5 and 6 to form an approximate rhombic shape as seen in plan view.

Figure 8:
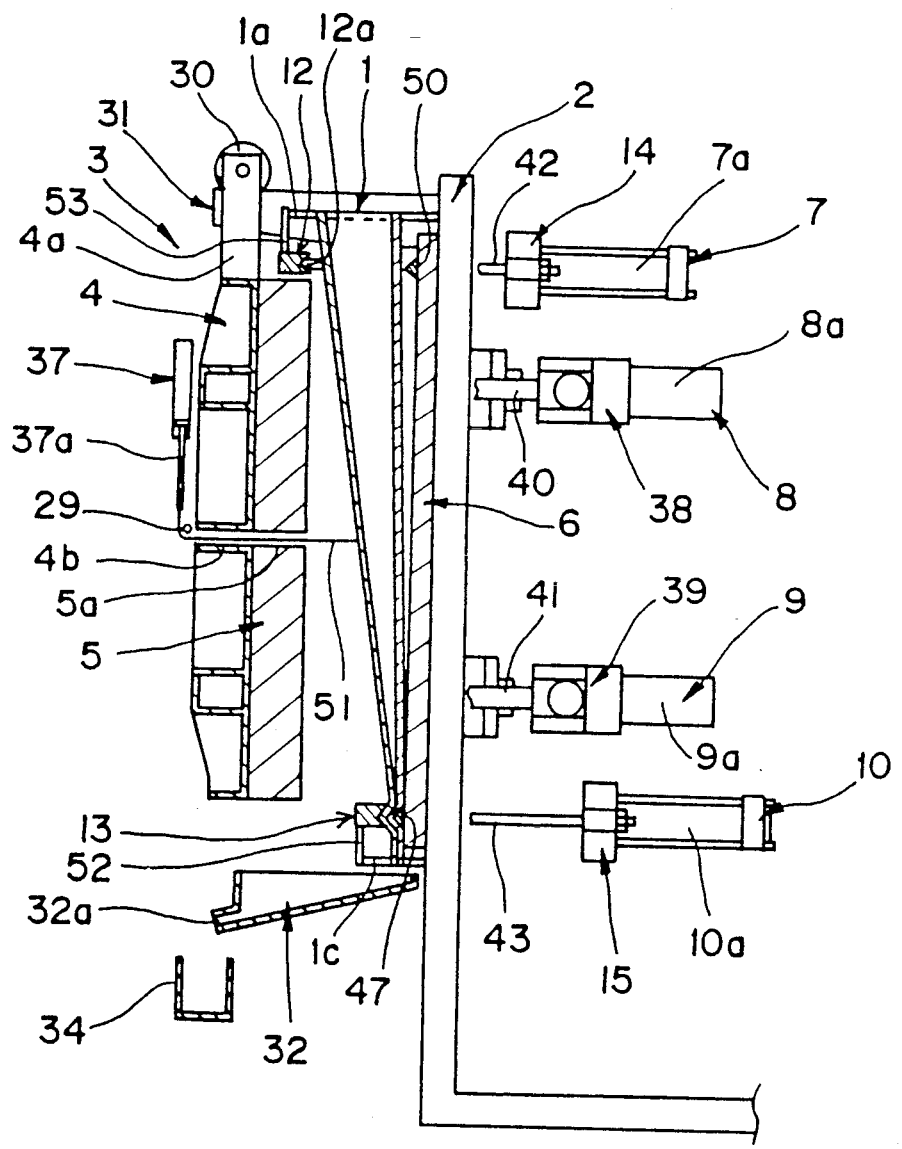

Then, as shown in FIG. 8, the first close cylinder 10 is driven to close the lower opening of the medium 1. At that time, the first close plate 13 approaches the frame 2 through the cutouts 6d formed at the lower end of the second push plate 6 in FIG. 2, and the recess 13a formed in the first close plate 13 is fitted on the projection 47 formed on the second push plate 6 while the lower end of the medium 1 is held therebetween, so that the lower opening of the medium 1 is closed. At that time, the piston rod 37a of the vibrating cylinder 37 moves downward in FIG. 8 so that any overload may not act on the medium 1. Then, the pan 32 is rotated from the retracting position I to the filtrate-receiving position II by the drive of the cylinder 11 so that the pan may receive the filtrate.

Figure 9:
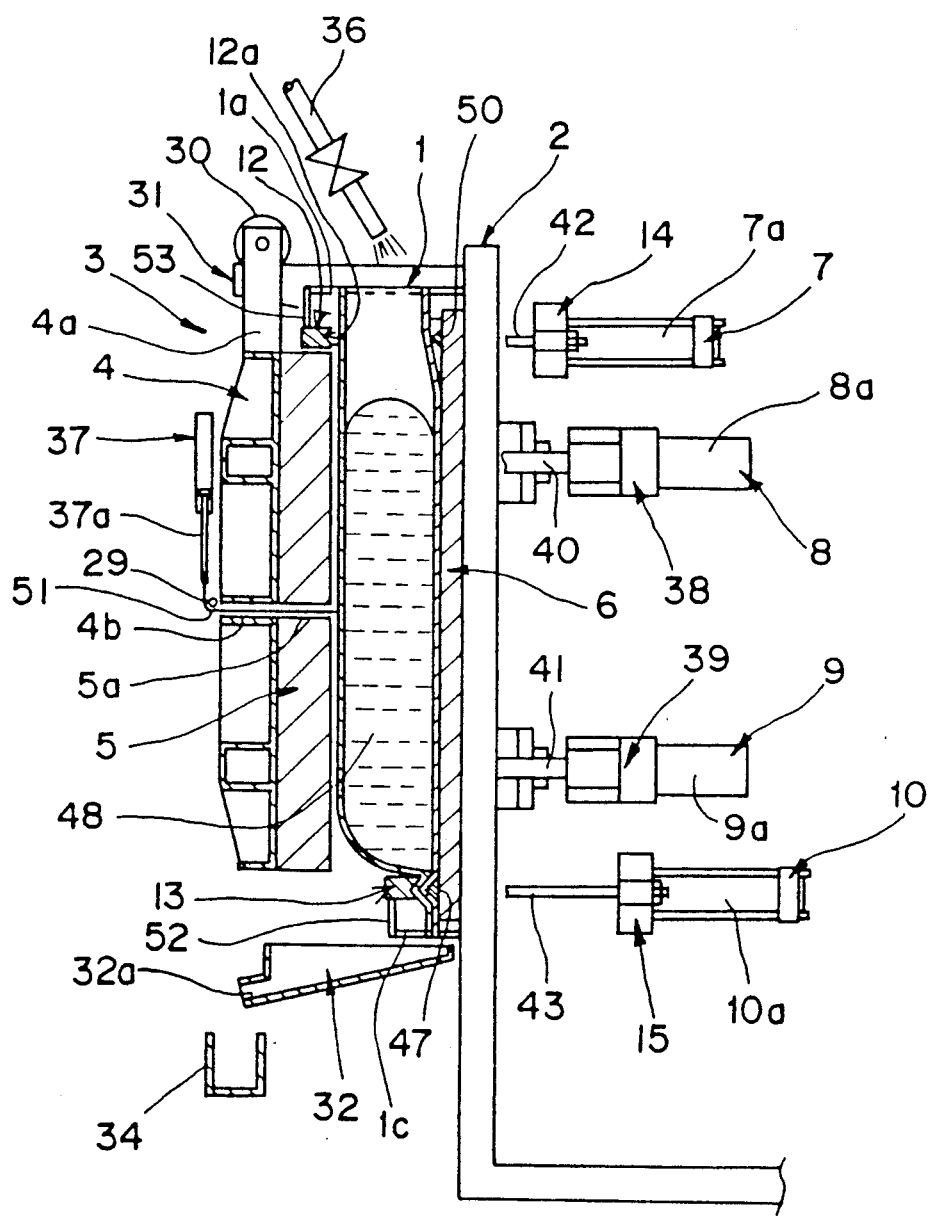

Sequentially, as shown in FIG. 9, the liquid to be filtered is fed into the medium 1, of which the lower opening has been closed to form a sack, from the liquid feed pipe 36 connected with the liquid feed device so as to be filtered. The filtrate dropped from the medium 1 is received by the pane 32 for collection in the trough 34.

Figure 10:
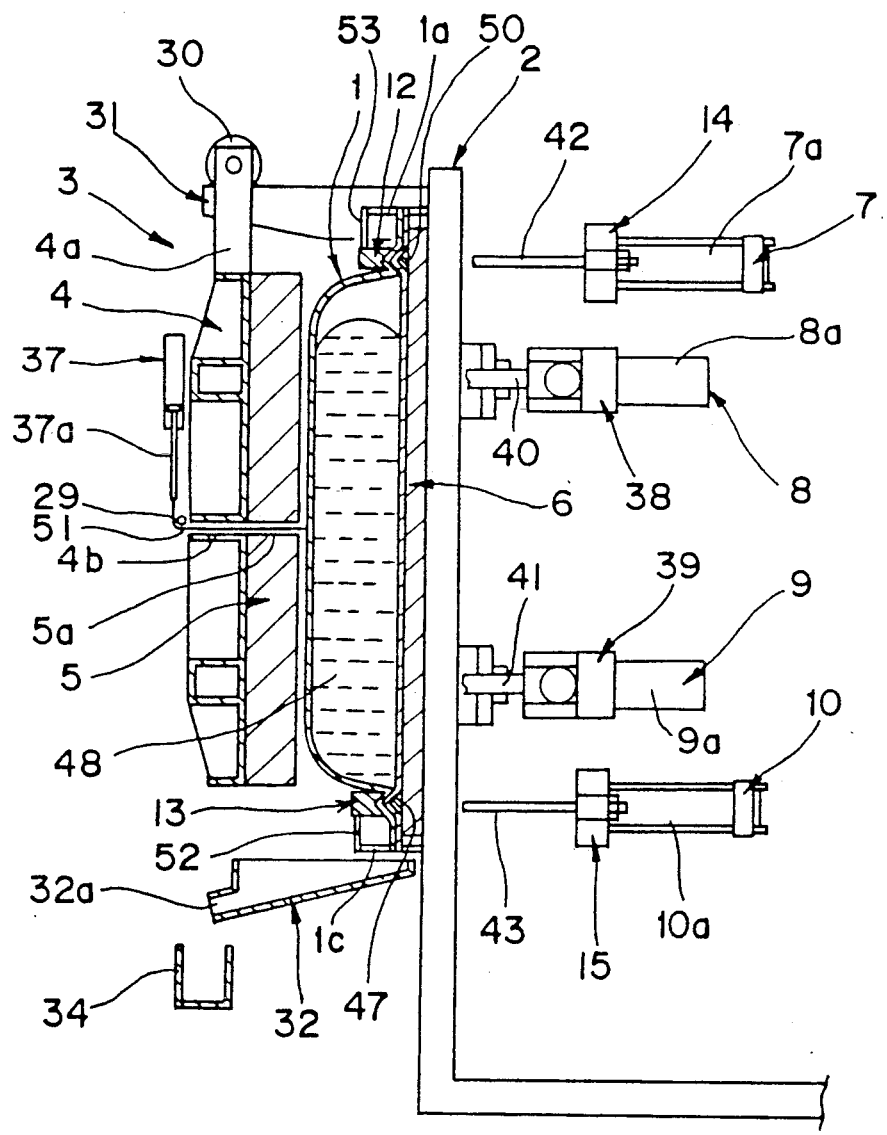

As shown in FIG. 10, the second close cylinder 7 is driven to close the upper opening of the medium 1. At that time, the second close plate 12 approaches the frame 2 through the cutouts 6c formed at the upper end of the second push plate 6 in FIG. 2, and the recess 12a formed in the second close plate 12 is fitted on the projection 50 formed on the second push plate 6 while the upper end of the medium 1 is held therebetween, so that the upper opening of the medium 1 is closed.

Figure 11:
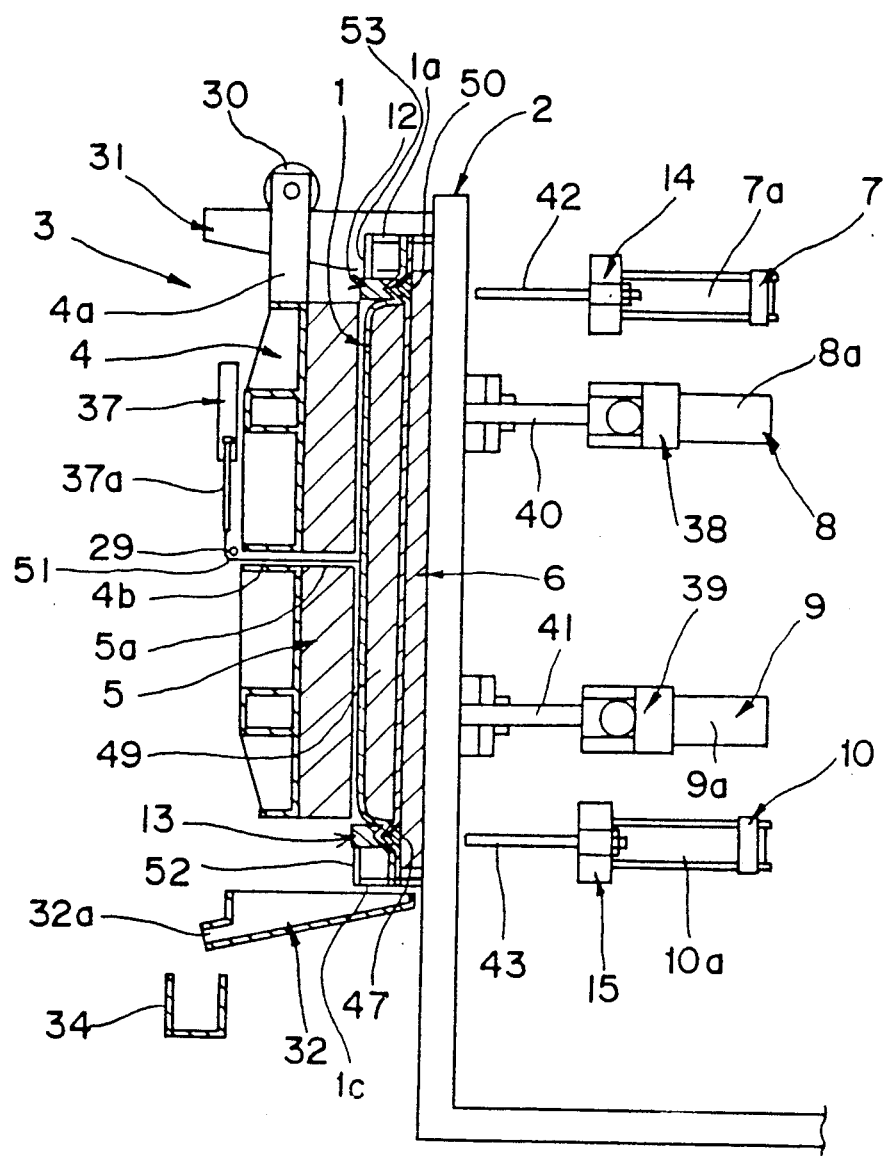

Then, as shown in FIG. 11, the first and second press cylinders 9 and 8 are synchronously driven to gradually press the medium 1 between the first and second push plates 5 and 6 so as to express the cake 49 held in the medium 1.

Figure 12:
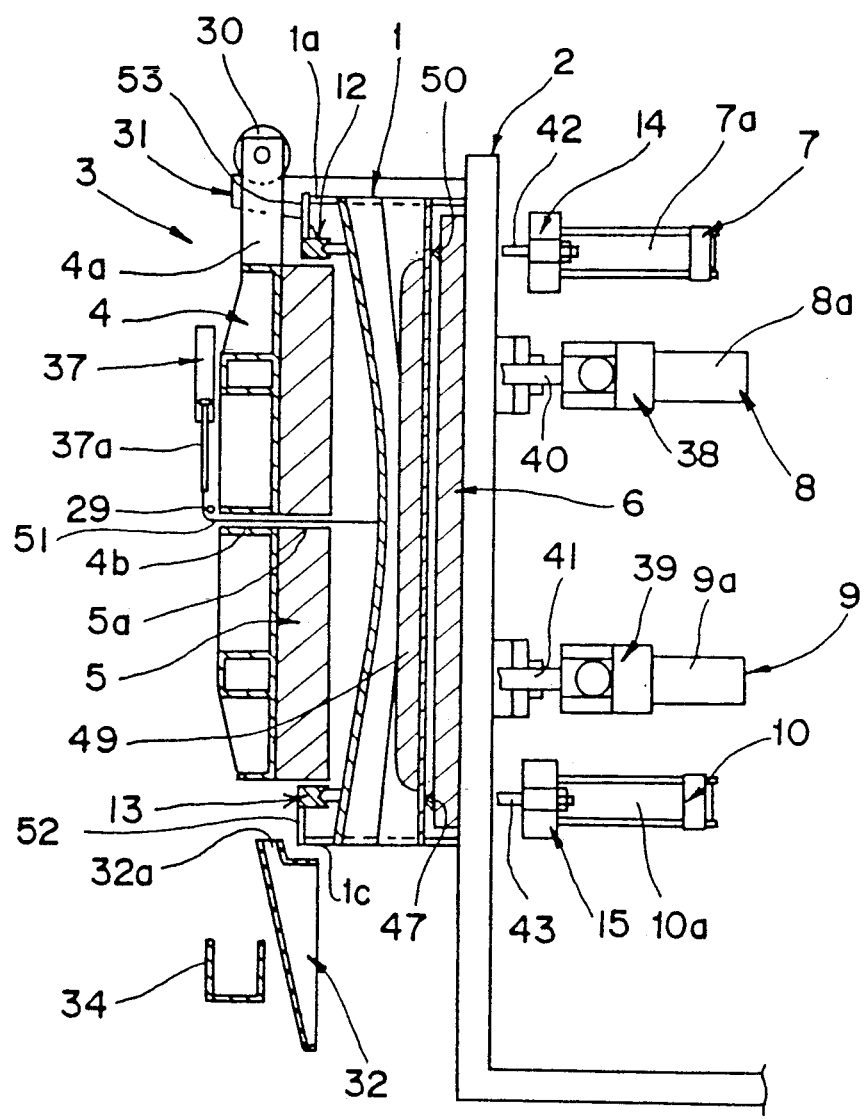
Figure 13:
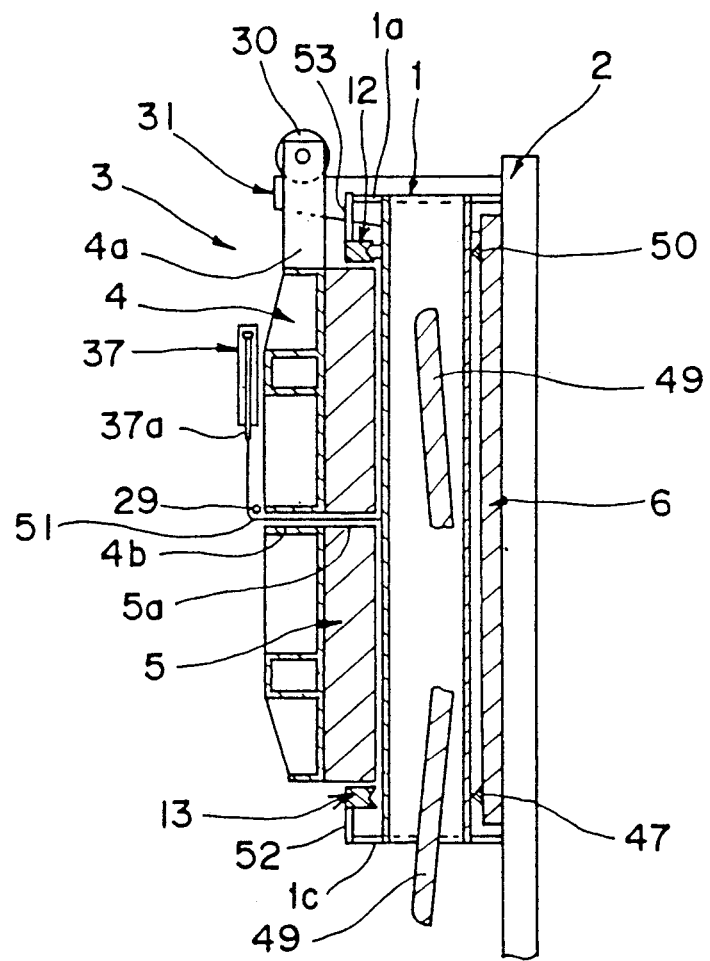

Next, as shown in FIG. 12, after completion of the expressing filtration, the first and second press cylinders 9 and 8 are driven in reverse to release the expression of the cake 49 in the medium 1 by the first push plate 5, and the pan 32 is rotated from the filtrate-receiving position II to the retracting position I by the cylinder 11. The first and second close cylinders 10 and 7 are reversely driven to open the upper and lower openings of the medium 1 so that the cake 49 in the medium 1 may fall down therefrom by its own weight so as to be collected by a collecting device such as a conveyer arranged under the front side of the frame 2. At that time, as shown in FIG. 13, the vibrating cylinder 37 is driven so that the medium 1 may be subjected to vibration. The vibration of the medium 1 is increased by repeated movement of the piston rod of the small cylinder connected with the wire 51 connected with the piston rod 37a of the vibrating 37 so that the vibration may be transmitted to the whole medium 1. Thus, the twelve flat springs 16, 20, and 24 are respectively moved in direction perpendicular to axes thereof by the vibration, with the result that the vibration of the whole medium 1 is further increased. By these vibration, the cake 49 adhering to the medium 1 falls down from the medium 1 to be collected by the conveyer. After completion of the collection of the cake 49, the first close cylinder 10 is driven to close the lower opening of the medium 1 for the preparation of the following filtration as shown in FIG. 8. In this way, in the embodiment, the vibrating cylinder 37, the wire 51, the small cylinder, and the twelve flat springs 16, 20, and 24 serve as the vibrating member.

During filtration, in the case where the filtration is operated without expression, the liquid is fed into the medium 1 of which the lower opening has been closed and after completion of the filtration, the pan 32 is moved from the filtration-receiving position II to the retracting position I and the first close cylinder 10 is driven in reverse to open the lower opening of the medium 1 so that the cake 49 in the medium 1 may fall down therefrom while the medium 1 is subjected to vibration by the vibrating member.

According to the embodiment, since the filter chamber is formed in the body 1d of the tubular medium 1, the filtration area and the configuration of the chamber may not be regulated by any member such as a filter plate, as compared with a filter chamber formed between a pair of filter cloths arranged between adjacent filter plates. Therefore, the medium 1 may change into any configuration in correspondence with the amount of the cake 49, resulting in a large degree of freedom for the medium 1 to fluctuate with respect to the cake 49. The whole surface area of the chamber constructed by the tubular medium 1c is an available filtration area. Therefore, the filtration efficiency of the press is greatly improved as compared with that of the filter press having filter plates. Since the medium 1 is supported hanging by the frame 2 through the strips 1a, 1b, and 1c, and is subjected to vibrations by the vibrating member, the whole medium 1 may be readily and effectively subjected to the vibration so as to easily discharge the cake of the medium 1 therefrom. According to the arrangement thereof, the cake 49 in the medium 1 may be expressed between the first and second push plates 5 and 6 by the drive of the press cylinders 8 and 9, with the result that the filtration efficiency of the liquid may be improved. The medium 1 is easily formed into a sack only by holding the lower end of the medium 1 between the recess 13a of the first close plate 13 and the projection 47. On the other hand, the reverse drive of the first close cylinder 10 causes the lower end of the medium 1 to be released. Thus, by its own weight, the lower opening of the medium 1 is forcedly opened and the cake 49 falls down, with the result that the cake 49 in the medium 1 may be discharged therefrom. Therefore, the mechanism for closing and opening the lower opening of the medium 1 may be very simple in construction. Furthermore, since the medium 1 is subjected to vibration by the vibrating member in discharging the cake 49, the cake 49 adhering to the medium 1 may be smoothly discharged from the medium 1, resulting in improved efficiency for discharging the cake 49.

Next, the second embodiment shown in FIG. 14 will be explained hereinbelow. In the second embodiment, a pressure sensor 60 for measuring the expressing pressure of the liquid in the medium 1, and a microcomputer including a control unit 61 for controlling the drive of the first and second air cylinders 10 and 7 and the drive of the hydraulic oil press cylinders 8 and 9 on the basis of the expressing pressure measured by the sensor 60 are arranged at the frame 2. Then, the lower opening of the medium 1 is closed by the lower first close plate 13 to form the filter chamber 80 in the medium 1. Then, the liquid is fed into the chamber 80 and after that, the upper opening of the medium 1 is closed by the upper second close plate 12. Then, the two press cylinders 8 and 9 are driven to move the movable plate 4 toward the frame 2 so as to express the liquid in the medium 1. At that time, the drive of the two press cylinders 8 and 9 are controlled in such a way that an expressing pressure-increasing process in which the expressing pressure of the movable plate 4 to act on the liquid is increased by a specified increment δ, and an expressing pressure-maintaining process in which the pressure remains constant for a specified period of time are alternately performed at least one time. As a result, the liquid is expressed under the specified expressing pressure so as to produce the cake 49 in the medium 1 which has a desired water content in correspondence with the pressure.

Figure 14:
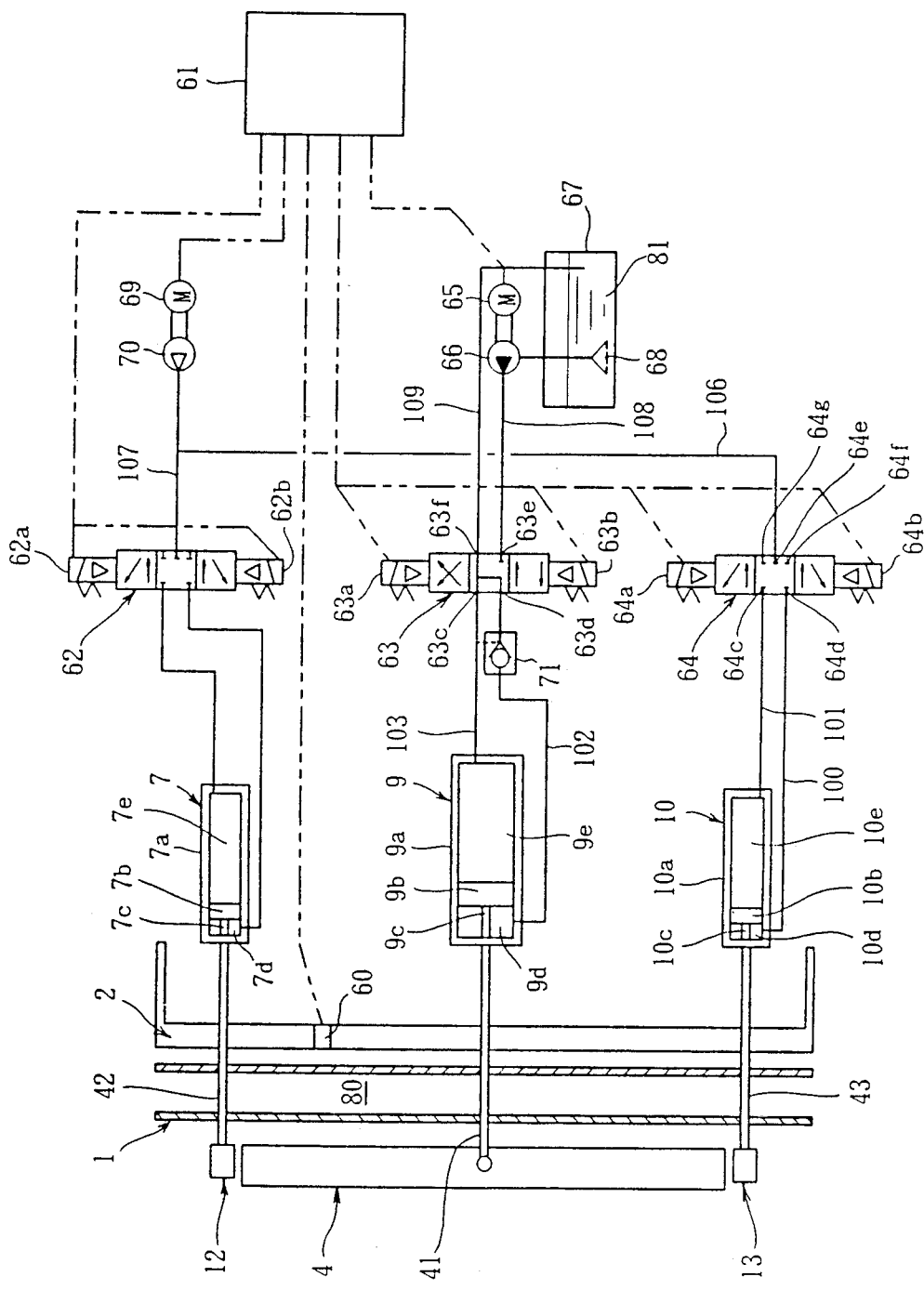
FIG. 14 is a schematic view showing the construction of the press employed in a filtration method according to one preferred embodiment of the present invention.

Only one cylinder 9 of the two press cylinders 8 and 9 which seems to be connected with the middle of the movable plate 4 in a longitudinal direction thereof is shown in FIG. 14 to simplify the drawing. However, in practice, the two cylinders 8 and 9 are respectively connected with the movable plate 4 in the vicinities of the upper and lower ends thereof (as described later).

The sensor 60 is attached to the frame 2 and is electrically connected to the control unit 61, so as to detect the expressing pressure under which the movable plate 4 presses the frame 2 through the medium 1 during the expressing filtration. That is, the pressure of the movable plate 4 acting on the liquid is measured by the sensor 60 which transmits a signal corresponding to the pressure to the unit 61.

As shown in FIG. 14, two pressure chambers 10d and 10e separated by the piston 10b in the cylinder body 10a of the first close cylinder 10 are respectively connected, through air feed pipes 100 and 101, with air exhaust ports 64c and 64d of a first electromagnetic directional control valve 64 capable of being switched by the unit 61. An air inlet port 64e of the valve 64 is connected, through an air feed pipe 106, with an air pump 70 driven by an electric motor 69 controlled by the unit 61. The first valve 64 has two exhaust ports 64f and 64g. When a solenoid coil at one end 64a of the first valve 64 is excited by the unit 61, so that the first valve 64 is changed from a center valve position to an opening position for opening the lower opening of the medium 1, the air inlet port 64e runs into the air exhaust port 64c of the two air exhaust ports 64c and 64d. On the other hand, when a solenoid coil at the other end 64b of the first valve 64 is excited by the unit 61 so that the first valve 64 is changed from the center valve position to a closing position for closing the lower opening of the medium 1, the air inlet port 64e runs into the air exhaust port 64d of the two air exhaust ports 64c and 64d.

Therefore, when the unit 61 drives the motor 69 and the solenoid coil of the one end 64a of the first valve 64 is excited so that the first valve 64 is moved to the opening position, air is fed under pressure by the air pump 70 into the first pressure chamber 10e of the air close cylinder 10 which is located on the opposite side of the piston 10b from the frame 2, through the air feed pipe 106, the air inlet port 64e, the air exhaust port 64c of the first valve 64, and the air feed pipe 101. On the other hand, air is exhaust from the second pressure chamber 10d of the close cylinder 10, which is located on the same side of the frame 2 as the piston 10b, through the air feed pipe 100, the air exhaust port 64d, and the exhaust port 64f of the two exhaust ports 64f and 64g. Thus, the piston 10b thereof moves leftward in FIG. 14, so that the first close plate 13 is driven to move away from the frame 2 so as to open the lower opening of the medium 1.

When the motor 69 is driven by the unit 61 and the solenoid coil of the other end 64 of the first valve 64 is excited so that the first valve 64 is moved to the closing position, air is fed under pressure by the air pump 70 into the second pressure chamber 10d of the air close cylinder 10 through the air feed pipe 106, the air inlet port 64e, the air exhaust port 64d of the first valve 64, and the air feed pipe 100. On the other hand, air is exhaust from the first pressure chamber 10e of the close cylinder 10 through the air feed pipe 101, the air exhaust port 64c, and the exhaust port 64g of the two exhaust ports 64f and 64g. Thus, the piston 10b thereof moves rightward in FIG. 14, so that the first close plate 13 is driven to approach the frame 2 so as to close the lower opening of the medium.

Therefore, in the second embodiment, the first close plate 13, the first connecting rods 43, the first air close cylinder 10, the first electromagnetic directional control valve 64, the air pump 70, and the motor 69 serve as the first close member for closing or opening the lower opening of the medium 1.

As shown in FIG. 14, the second air close cylinder 7 is connected with the air pump 70 through a second electromagnetic directional control valve 62 for being switched by the unit 61. The second directional control valve 62 has the same construction as that of the first valve 64 and is connected with the other members in the same way as the first valve 64 is connected with the first air close cylinder 10 and the air pump 70.

Then, when the motor 69 is driven by the unit 61 and the second valve 62 is changed between an opening position, a center valve position, and a closing position, in the same way as discussed above for the first valve 64, the piston 7b of the second air close cylinder 7 moves leftward or rightward in FIG. 14, with the result that the second close plate 12 is driven to move away from or to approach the frame 2 so as to open or close the upper opening of the medium 1.

Therefore, in the second embodiment, the second close plate 12, the second connecting rods 42, the second air close cylinder 7, the second electromagnetic directional control valve 62, the air pump 70, and the motor 69 serve as the second close member for closing or opening the upper opening of the medium 1.

As shown in FIG. 14, two pressure chambers 9d and 9e separated by the piston 9b in the cylinder body 9a of the second press cylinder 9 are respectively connected, through a oil feed pipe 102, a pilot operated check valve 71, and an oil feed pipe 103, with oil exhaust ports 63c and 63d of a third electromagnetic directional control valve 63 capable of being switched by the unit 61. In the pilot operated check valve 71, oil 81 may flow in only the direction from the third valve 63 to the first hydraulic press cylinder 9 under fairly low or no pressure of the pilot. On the other hand, when the oil 81 flows through the oil feed pipe 103 connected with the first pressure chamber 9e of the two chambers 9d and 9e, which is located on the opposite side of the piston 9b from the frame 2, the pressure of the pilot in the check valve 71 is sufficiently high so that the oil 81 may flow in both directions between the third valve 63 and the first hydraulic press cylinder 9 through the check valve 71. An oil inlet port 63e of the third valve 63 is connected, through an oil feed pipe 108, with an oil pump 66 driven by an electric motor 65 controlled by the unit 61. The oil pump 66 also the oil 81 accommodated in an oil sump 67 to pump oil into the third valve 63 through a filter 68. An oil exhaust port 63f of the third valve 63 is connected with the oil sump 67 through an oil feed pipe 109. When the solenoid coil at one end 63a of the third valve 63 is excited by the unit 61, so that the third valve 63 is changed from a center valve position to a movable plate-moving-away position, the oil inlet port 63e runs into the oil exhaust port 63c of the two oil exhaust ports 63c and 63d. On the other hand, a solenoid coil at the other end 63b of the third valve 63 can be excited by the unit 61, so that the third valve 63 is changed from the center valve position to a movable plate-approaching-position and the oil inlet port 63e runs into the oil exhaust port 63d of the two oil exhaust ports 63c and 63d.

Therefore, when the motor 65 is driving by the unit 61 and the solenoid at one end 63a of the third valve 63 is excited, so that the third valve 63 is moved to the movable plate-moving-away position, the oil 81 is fed into the first pressure chamber 9e of the first hydraulic press cylinder 9 by the oil pump 66 through the oil feed pipe 108, the oil inlet port 63e, the oil exhaust port 63c of the two oil exhaust ports 63c and 63d, and the oil feed pipe 103 under pressure. In this case, since the pressure of the pilot is sufficiently high in the check valve 71, the oil 81 accommodated in the second pressure chamber 9d of the hydraulic press cylinder 9, which is located at the same side of the piston 9b as the frame 2, is discharged therefrom into the sump 67 through the oil feed pipe 102, the check valve 71, the oil exhaust port 63d of the two oil exhaust ports 63c and 63d, the oil exhaust port 63f, and the oil feed pipe 109. Thus, the piston 9b thereof moves leftward in FIG. 14 so that the movable plate 4 may be driven to move away from the frame 2.

When the motor 65 is driven by the unit 61 the solenoid at the other end 63b of the third valve 63 is excited so that the third valve 63 is moved to the movable plate-approaching position, the oil 81 is fed into the second pressure chamber 9d of the first hydraulic press cylinder 9 by the oil pump 66 through the oil feed pipe 108, the oil inlet port 63e, the oil exhaust port 63d of the two oil exhaust ports 63c and 63d, the check valve 71, and the oil feed pipe 102 under pressure. The oil 81 is accommodated in the first pressure chamber 9e of the hydraulic press cylinder 9 is discharged therefrom into the sump 67 through the oil feed pipe 109. Thus, the piston 9b thereof moves rightward in FIG. 14 so that the movable plate 4 maybe driven to approach the frame 2. Since the check valve 71 is arranged between the second pressure chamber 9d of the first hydraulic press cylinder 9 and the third valve 63, it may prevent the oil from flowing in a direction from the second pressure chamber 9d to the third valve 63 in feeding the oil into the second pressure chamber 9d under pressure. Therefore, it may limit the pressure under which the movable plate 4 presses the frame 2, that is, the expressing pressure of the plate 4 acting on the liquid to limit the expressing filtration.

The second hydraulic press cylinder 8 is connected with the oil pump 66 through a fourth electromagnetic directional control valve (not shown) for being switched by the unit 61 which has the same construction as that of the third valve 63, and a pilot operated check valve (not shown) having the same construction as that of the check valve 71. The second press cylinder 8 is arranged in the same way as the first hydraulic press cylinder 9 is connected with the oil pump 66 through the third valve 63 and the pilot operated check valve 71.

Then, when the motor 66 is driven by the unit 61 and the third valve 63 is switched, the fourth valve is switched by the unit 61 simultaneously. Then, the piston (not shown) of the second hydraulic press cylinder 8 is driven to move leftward or rightward in FIG. 14.

Therefore, the first and second hydraulic press cylinders 9 and 8 are simultaneously driven, so that the movable plate 4 approaches or moves away from the frame 2. In the second embodiment, the pair of the third connecting rods 41, the first hydraulic press cylinder 9, the third valve 63, the check valve 71 connected with the third valve 63, the oil pump 66, the motor 65, the pair of the fourth connected rods 40, the second hydraulic press cylinder 8, the fourth valve, and the check valve connected with the fourth valve serve as the driving means for driving the movable plate 4 to approach or to move away from the frame 2.

The vibrating cylinder 37 and the cylinder 11 for operating the pan 32 are connected with the air pump 70 through an electromagnetic directional control valve (not shown) switched by the unit 61 in the same way as the two air close cylinders 10 and 7 are connected with the air pump 70.

Figure 16A:
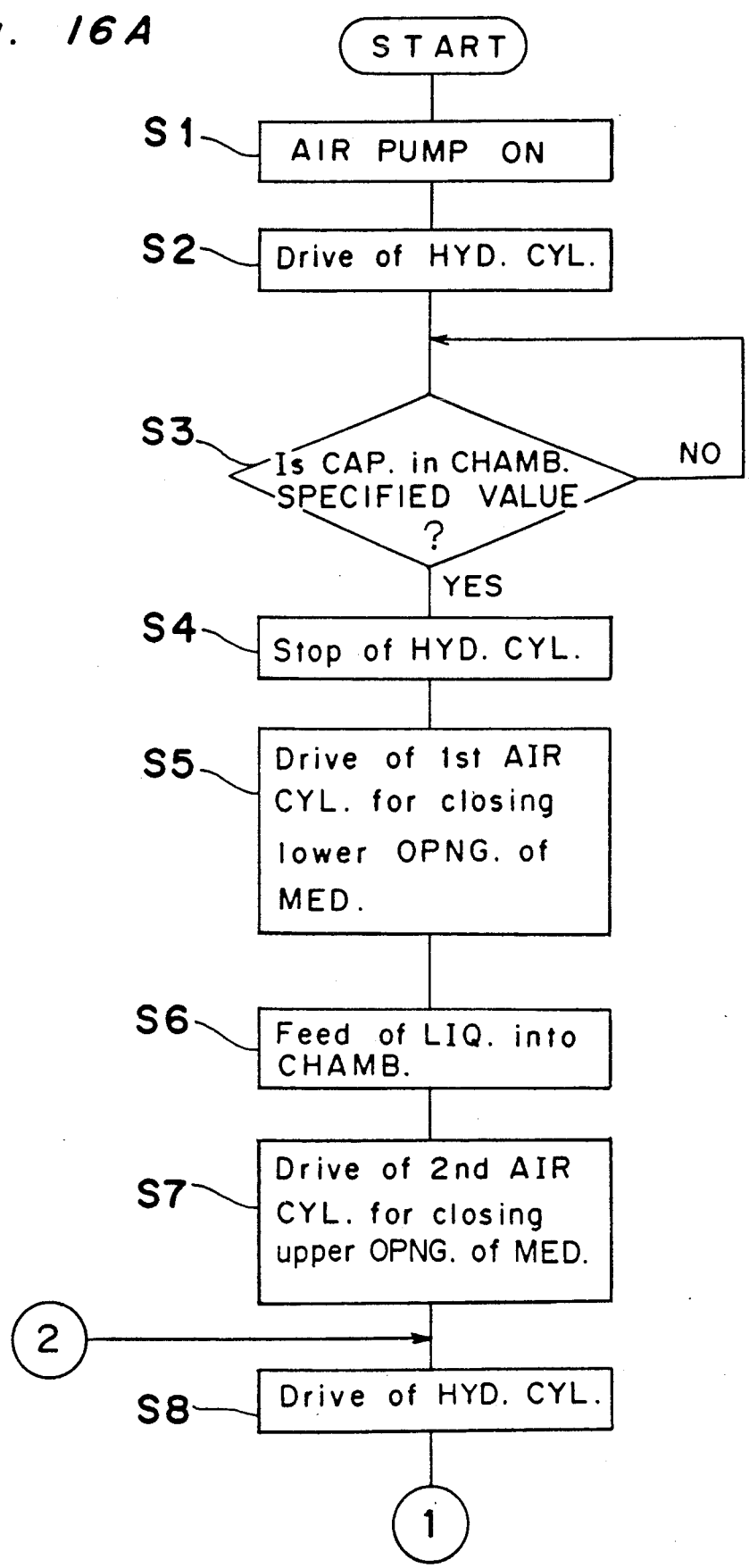
FIGS. 16A and 16B are flow charts showing a control sequence for a control unit of the press.
Figure 16B:
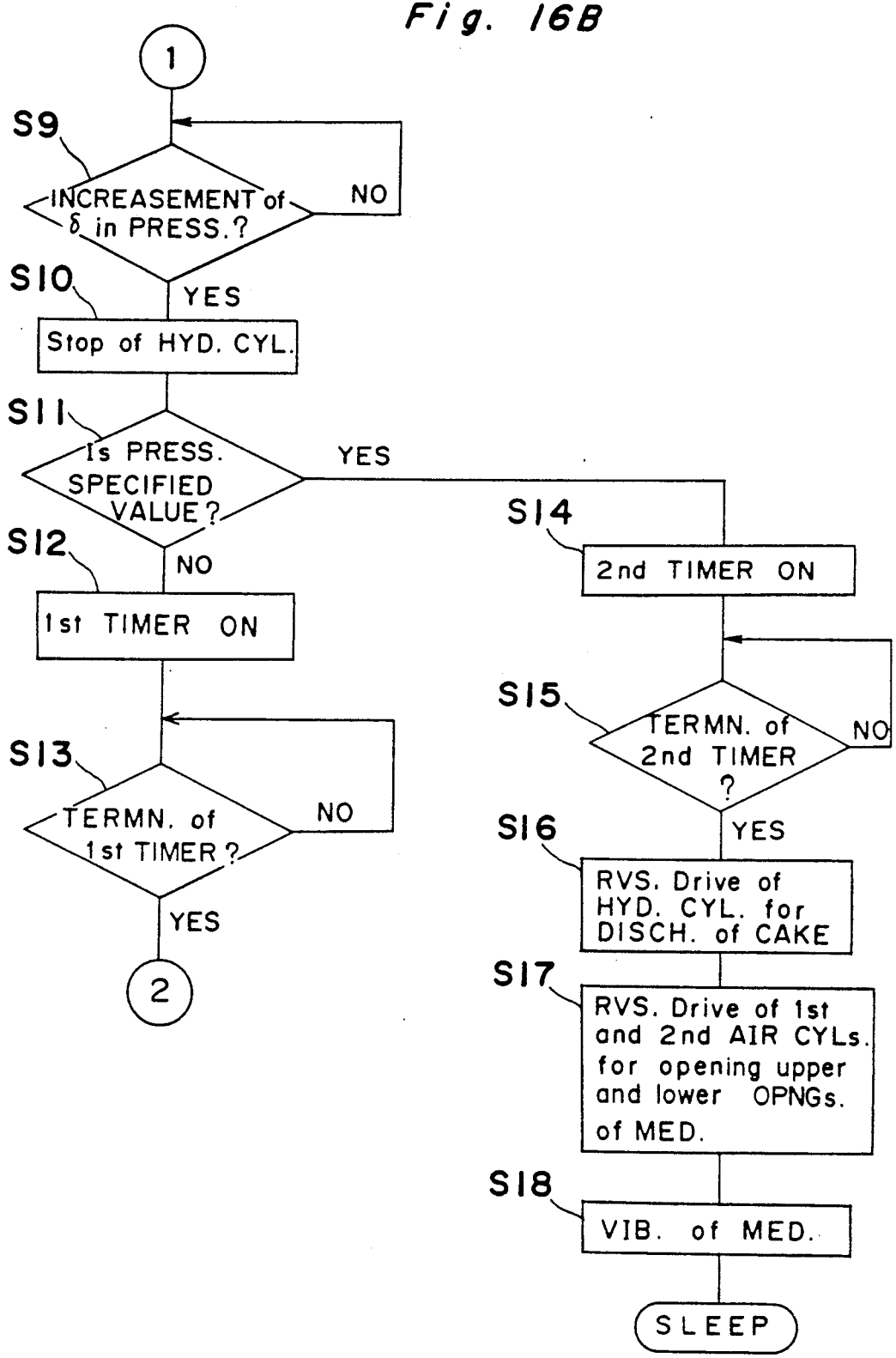

As shown in FIGS. 16A and 16B, the unit 61 includes: the drive start means S8 for starting to drive the driving means 8, 9, 40, 41, 63, 65, 66, and 71 so as to move the movable plate 4 in a direction in which the plate 4 presses the frame 2 for starting the expressing pressure-increasing process; a first judging means S9 for detecting the increase in the expressing pressure by the specified increment $\delta$ of, for example, 1 kg/cm$^2$ in the increasing process; a stop means S10 for stopping driving the driving means 8, 9, 40, 41, 63, 65, 66, and 71 when it is judged by the means S9 that the pressure has increased by the increment $\delta$; first timer means S12 and S13 for measuring a first specified period $T_1$ in the expressing pressure-maintaining process after the completion of the increasing process; a second judging means S11 for detecting the increase to the specified value in the expressing pressure after either of the processes; a drive restart means for restarting to drive the driving means 8, 9, 40, 41, 63, 65, 66, and 71 so as to restart the increasing process after the maintaining process when it is judged by the second judging means S11 that the expressing pressure has not reached the specified value; and a stop means for terminating the expressing filtration after the second increasing process or the maintaining process when it is judged by the second judging means S11 that the expressing pressure has reached the specified value.

Next, the filtration method according to the embodiment will be explained referring to FIGS. 15, 16A and 16B.

The movable plate 4 and the two close plates 12 and 13 are positioned at their furthest distance away from the frame 2 as shown in FIG. 5. A power source for the press 3 is turned on to start the control for the following expressing filtration by the unit 61 in the condition where the piston rod 37a of the vibrating cylinder 37 pulls the approximate center portion of the surface, which confronts the first push plate 5, of the medium 1 toward the first push plate 5 through the wire 51.

That is, firstly, at the step S1, the drive of the motor 69 is started so as to start the drive of the pump 70.

Next, at the step S2, in order to set the capacity of the chamber 80 to a desired value, the drive of the motor 65 is started to drive the oil pump 66, and the solenoid coil at the other end 63b of the third valve 63 and the solenoid coil of the other end of the fourth valve are simultaneously excited, so that the third and fourth valves 63 are changed from the center valve positions to the movable plate-approaching positions respectively. Thus, the rightward movement of each piston of the two hydraulic press cylinders 8 and 9 starts in FIG. 5 and the movable plate 4 starts to approach the frame 2.

Then, as the step S3, on the basis of a signal outputted from a positioning sensor (not shown) arranged above the movable plate 4, the movement of the movable plate 4 is detected until the plate 4 reaches a specified position.

At step S3, the oil pump 66 keeps being driven until the movable plate 4 reaches the specified position. Then, when it is judged that the movable plate 4 has reached the specified position, the motor 65 will be stopped so as to stop driving the oil pump 66 at the step S4. Then, the excitation of both of the solenoid coil of the one end of the fourth valve is released, so that the valves return to the center valve positions and each piston rod of the two hydraulic press cylinders 8 and 9 stops moving, resulting in stopping of the movement of the movable plate 4. Thus, as shown in FIG. 7, the capacity of the chamber 80 which is defined by a distance between the movable plate 4 and the frame 2 is set to the desired value.

Next, at the step S5, the solenoid coil at the other end 64b of the first valve 64 is excited to change the first valve 64 from the center valve position to the closing position. Thus, the rightward movement of the piston 10b of the first air close cylinder 10 in FIG. 7 starts, with the result that the first close plate 13 is started to drive to approach the frame 2. Thus, the first close plate 13 approaches the frame 2 through the cutouts 6d formed at the lower end of the second push plate 6 in FIG. 5. As a result, as shown in FIG. 8, the recess 13 formed in the first close plate 13a is fitted on the projection 47 of the second push plate 6 through the lower end of the medium I, such that the lower opening of the medium 1 closed and the result the drive of the first air close cylinder 10 is stopped. After that, the first valve 64 is maintained in the state in which the solenoid coil at the other end 64b thereof is being excited so as to prevent reduction of the closing force of the firs close plate 13 acting on the lower end of the medium 1. The directional control valve connected with the vibrating cylinder 37 is controlled in correspondence with the drive of the first close plate 13 such that the piston rod 37a of the vibrating cylinder 37 is driven to move downward in FIG. 8 so as not to overload the medium 1. By controlling the movement of the directional control valve connected with the cylinder 11 for operating the pan 32, the pan 32 is rotated from the retracting position I to the filtrate receiving position II by the drive of the cylinder 11, with the result that the filtrate may be received by the pan 32.

Next, at the step S6, an electromagnetic directional control valve arranged on the liquid feed pipe 36 is opened and the liquid to be filtered is fed from the pipe 36, which is connected with a liquid tank for accommodating the liquid to be filtered, into the medium 1 of which the lower opening is closed to form a sack, through the upper opening of the medium 1, as shown in FIG. 9. After that, the level of the liquid in the medium 1 is detected by a level sensor arranged above the medium 1 or a specified period for feeding the liquid is detecting by an inner timer arranged in the unit 61, with the result that the valve connected with the pipe 36 is closed at a specified timing to stop the feeding of the liquid.

At the step S7, the solenoid coil at the other end 62b of the second valve 62 is excited to change the second valve 62 from the center valve position to the closing position. Then, the rightward movement of the piston 7b of the second air close cylinder 7 in FIG. 9 starts to start the drive of the second close plate 12 so that the plate 12 may approach the frame 2. Thus, as shown in FIG. 10, the upper opening of the medium 1 is closed by the second close plate 12 in the same way as the lower opening of the medium 1 is closed by the first close plate 13. After that, the second valve 62 maintains the state in which the solenoid coil at the other end 62b thereof is being excited such that the upper opening of the medium 1 is maintained in the closed state.

At the step S8, similarly to the case at the step S2, the drive of the movable plate 4 is started to allow it to approach the frame 2 by driving the oil pump 66 and the hydraulic press cylinders 8 and 9 on the basis of the control of the third and fourth valves 63. Thus, the medium 1 starts to be pressed between the first and second push plates 5 and 6. Then, the expression of the cake in the chamber 80 starts and the expressing pressure for the liquid starts to increase, resulting in start of the expressing pressure-increasing process. At that time, the filtrate dropped from the medium 1 is received by the pan 32 for collection in the through 34.

At the step S9, on the basis of the signal with respect to the pressure which is outputted from the pressure sensor 60, the pressure is checked after the start of movement of the movable plate 4 until the pressure increases by the increment δ, that is, 1 kg/cm$^2$. that is, the pressure is checked when the difference between the expressing pressure before the start of the drive of the movable plate 4 and that after the start of the drive thereof reaches 1 kg/cm$^2$.

At the step S9, when it is judged that the expressing pressure has increased by 1 kg/cm$^2$, the drive of the movable plate 4 will be stopped at the step S10 as well as the step S4.

At the step S11, it is judged whether the pressure after the stop of the drive of the movable plate 4 at the step S10 has reached a specified value, for example, 3 kg/cm$^2$, in correspondence to the desired water content.

At the step S11, when it is judged that the pressure has not reached the value, the first timer will start at the step S12. After that, at the step S13, it is detected whether the first timer has been terminated. That is, the elapse of the first specified period $T_1$, for example, four minutes, is detected. By this operation, the expressing pressure is maintained constant and the maintaining process is performed. After that, when at the step S13, it is judged that four minutes has elapsed, the program will return to the step S8. Then, the drive of the two hydraulic press cylinders 8 and 9 is restarted to restart the increasing process and then the operations at the steps S9–S11 are executed.

On the other hand, when at the step S11, it is judged that the pressure has reached the specified value 3 kg/cm$^2$, the following operation will be executed. That is, the operations at the steps S8–S13 are repeatedly executed until it is judged that the pressure has reached the specified value. In this case, since the increment $\delta$ equals 1 kg/cm$^2$, the increasing process is repeated three times and the maintaining process is performed between the increasing processes, with the result that the pressure reaches the specified value of 3 kg/cm$^2$.

Next, a second timer starts at the step S14.

After that, it is checked that the second timer terminates at the step S15. That is, the elapse of a second specified period, for example, three minutes, is detected. Thus, the maintaining process is performed with the pressure maintained at the specified value of 3 kg/cm$^2$. Then, as shown in FIG. 11, the cake 49 with the desired water content corresponding to the specified value of 3 kg/cm$^2$ in the chamber 80 is produced.

After that, when it is judged that three minutes has elapsed a the step S15, the drive of the motor 65 will be started to start the drive of the oil pump 66 at the step S16. Then, the solenoid coil at the one end 63a of the third valve are simultaneously excited to move the valves from the center valve positions to the moving-away positions. thus, the leftward movement of each piston of the two hydraulic press cylinders 8 and 9 in FIG. 11 starts to starts the movement of the moveable plate 4 sot at the plate 4 may move away from the frame 2. After that, when, on the basis of the signal outputted from the positioning sensor arranged above the movable plate 4, it is judged that the movable plate 4 has moved furthest away from the frame 2 as shown in FIG. 12, the drive of the motor 65 will be stopped to stop the drive of the oil pump 66. Then, the excitation both of the solenoid coil at the one end 63a of the third valve 63 and the solenoid coil at the one end of the fourth valve is released to move the valves from the moving-away positions to the center valve positions. Thus, the movement of each piston of the two hydraulic press cylinders 8 and 9 stops so as to stop movement of the movable plat 4. As well as this operation, the control of the directional control valve connected with the cylinder 11 for operating the pan 32 allows the pan 32 to move from the filtrate receiving position II to the retreating position I.

Then, at the step S17, the excitation of the solenoid coil of the other end 64b of the first valve 64 is released to excite the solenoid coil of the one end 64a of the first valve 64. As a result, the first valve 64 is changed from the closing position to the opening position through the center valve position and the excitation of the solenoid coil at the other end 62b of the second valve 62 is released to excite the solenoid coil at the one end 62a thereof so as to change the second valve 62 from the closing position to the opening position through the center valve position. Thus, the leftward movement of each piston of the two air close cylinders 7 and 10 in FIG. 11 starts to start the drive of the two close plates 12 and 13 so that the plates 12 and 13 move away from the frame 2. After that, when, on the basis of signals outputted from a positioning sensor arranged under the first close plate 13 and a positioning sensor arranged above the second plate 12, it is judged that the two close plates 12 and 13 have been moved furthest away from the frame 2 as shown in FIG. 12, the excitation both of the solenoid coil at the one end 64a of the first valve 64 and the solenoid coil at the one end 62a of the second valve 62 will be released. As a result, the valves 64 and 62 are moved from the opening positions to the closing positions through the center valve positions so as to stop the movement of each piston of the two air close cylinders 7 and 10 so as to stop the movement of the two close plates 12 and 13. Thus, the upper and lower openings of the medium 1 are opened and most of the cake 49 produced in the medium 1 falls down by its own weight.

Next, at the step S18, by the control of the directional control valve connected with the vibrating cylinder 37, the piston rod 37a of the vibrating cylinder 37 moves upward and downward in FIG. 12. As a result, the whole medium 1 is subjected to large vibrations, so that the cake 49 adhering to the medium 1 is forced to fall down from the medium 1. After that, the drive of the motor 69 is stopped to stop the drive of the air pump 70.

Figure 15:
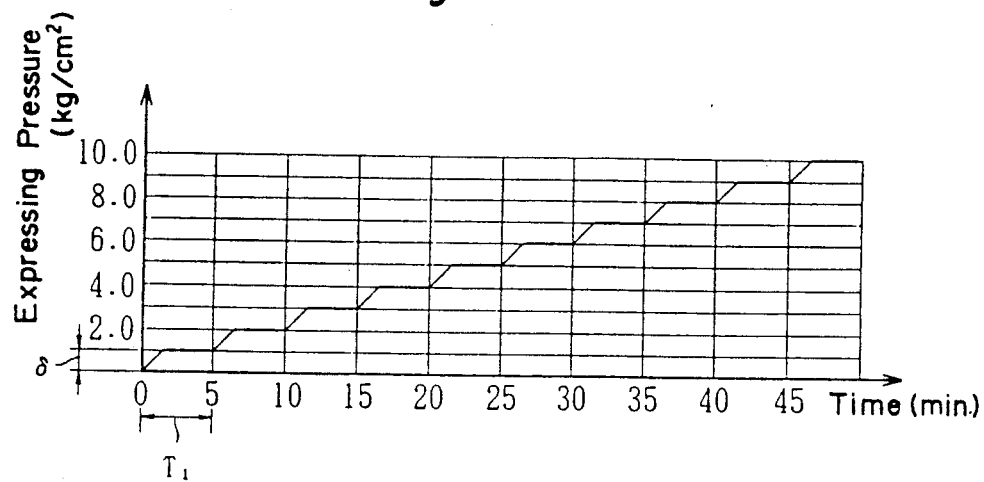
FIG. 15 is a graph showing the relation between expressing pressure and time during expressing filtration of liquid to be filtered by the method.
Figure 17:
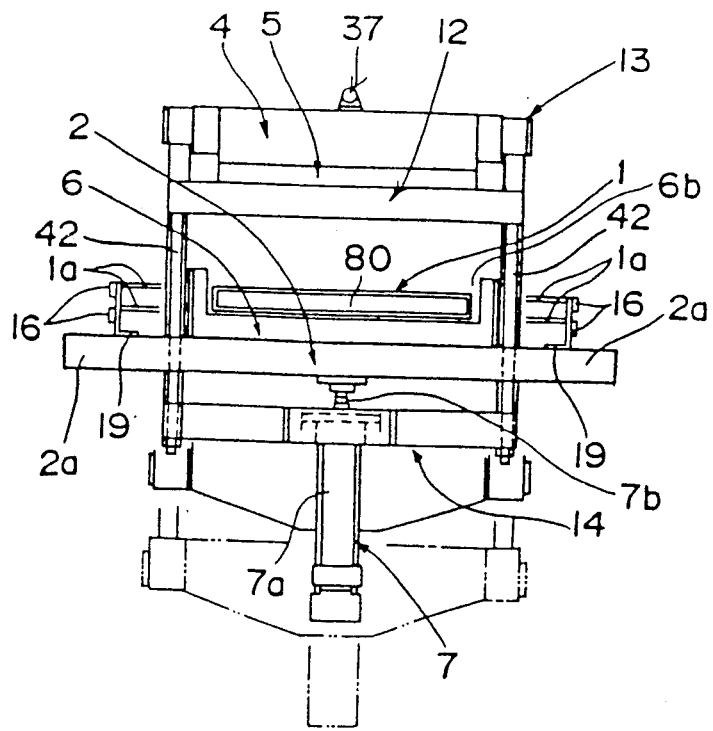
FIG. 17 is a plan view of the press.

In this way, the above-described filtration method produces a gradual increase in the expressing pressure for the liquid until the pressure reaches the specified value as shown in FIG. 15.

By the filtration method according to the embodiment, when the expressing filtration of the liquid is performed, the expressing pressure increasing-process for increasing the pressure by the specified increment $\delta$, and the expressing pressure maintaining-process for maintaining the pressure constant are alternately performed at least one time so as to produce the cake 49 with the desired water content in the chamber 80. Therefore, since it may produce the gradual increase in the expressing pressure rather than an abrupt increase in the pressure, the expressing filtration of liquid to be filtered with any characteristic may be performed while preventing adhesion of cake to the inner surface of the medium 1 which causes disturbance of the expressing filtration. With this operation, there is no limitation on the characteristics of the liquid capable of being filtered.

According to the filter press 3 of the embodiment, it is not required to provide a pressing diaphragm as required in conventional filter presses. Thus, the expressing filtration of liquid corroding rubber may be performed by directly pressing the liquid between the movable plate 4 and the frame 2 through the medium 1.

Furthermore, in the press 3, the expressing pressure in the chamber 80 is directly measured by the pressure sensor 60 and the control of the expressing filtration of the liquid is performed by the unit 61 on the basis of the measured pressure value. Then, the expressing pressure may be correctly increased to the specified value, as compared with the conventional filter press in which the expressing filtration of the liquid is performed by the control of the compressed air of the pressing diaphragm. Therefore, the cake 49 may be produced with great accuracy in the desired water content.

Since the four filter presses 3 are arranged at the frames 2 with each frame 2 connected with each other through a flat connecting member 45 to form an approximately octagon-shaped frame and operated with the frames, either the synchronously or individually output of the liquid to be filtered is at least four times that of the conventional filter press, resulting in efficient and economical operation of the filtration. Therefore, in the case where the four presses 3 are operated by one, one filter press 3 of the presses 3 may be prepared for filtration during the filtration operation of another filter press 3 thereof. Thus, just after the completion of the operation of another filter press 3, the one filter press may be operated to provide filtration, with the result that the presses 3 are operated with little down time of the filtration with respect to the combination of all the presses. Then, as compared with the conventional filter press, the time interval from the filtration operation to the next filtration operation may be reduced. On the other hand, in the case where the presses 3 are simultaneously operated, the output of the liquid is four times that of the conventional filter press, with the result that the required time to reach a desired output thereof in the press according to the embodiment may be shorter than that in the conventional filter press.

Figure 18:
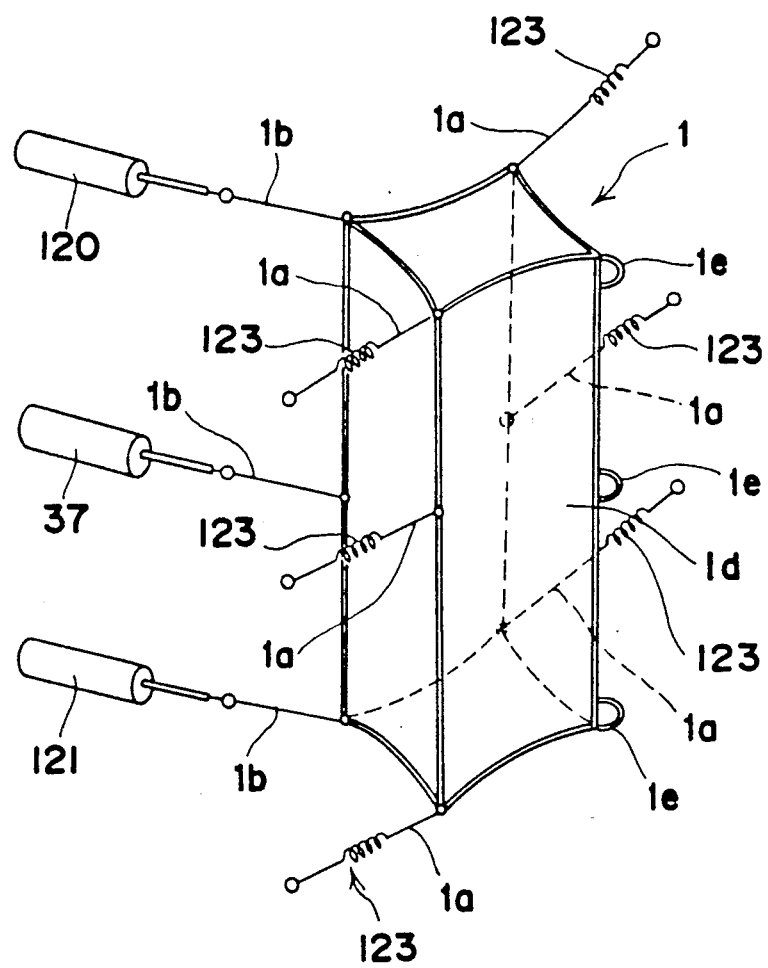
FIG. 18 is a schematic perspective view of a filter medium according to another embodiment of the present invention.

The present invention is not limited to the embodiments described and can be put into practice in other various forms as described hereinbelow. For example, the flat springs 16, 20, and 24 and the cylinder 37 may be connected with the 1d of the medium 1 without the strips 1a and 1b. As shown in FIG. 18, coil springs 123 may be used as vibration increasing members instead of the flat springs 16, 20, and 24, and additionally the upper and lower ends of the body 1d of the medium 1 may be pulled by vibrating cylinders 120 and 121. The positions in which the strips are attached to the body 1d and the number of strips in each of the positions are not limited to the embodiments described above and any number of the strips may be designed to be attached to the medium 1 at any position, in correspondence with the longitudinal length of the medium 1. As another support construction of the medium 1, it may be so constructed that one corner of the medium 1 is fixed to the frame 2 by U-shaped fixture 1e serving as fixing members, that the opposite corner of the medium 1 is supported by the vibrating cylinders 37, 120, and 121, and that other corners thereof are supported by the coil springs 123, as shown in FIG. 18, with the result that the medium 1 is subjected to vibration by the drive of the cylinders 37, 120, and 121. In another construction thereof, the medium 1 is supported hanging only by springs, with the result that the medium 1 may be subjected to vibration by striking the medium 1 at a desired time. The configuration of the medium 1 is not limited to the square tubular shape and may be a tubular member of polygon shape such as triangular or pentagonal. The first and second close cylinders 10 and 7 and the press cylinders 8 and 9 each may be air cylinders, hydraulic cylinders or any other known driving means for performing the same operation. The press cylinders 8 and 9 may press not only in one direction but also in two directions so as to perform the same operation described above. In the arrangement, if the strips 1a, 1b, and 1c are detachably connected with the cylinders 37, 120, and 121 and the springs 16, 20, 24, and 123, for example, by tying, untying knots of the strips may allow easy disengagement of the connection between the cylinders and the springs, and the strips.

Moreover, the plan view configuration of the support frame arrangement is not the octagon shape but can be shaped as any polygon such as a rectangular, dodecagon or regular octagon using the connecting members 45 or without the members 45.

Furthermore, though in the embodiments, the medium 1 is the tubular member, the medium 1 may also be constructed as follows. That is, the medium 1 can be constructed of a pair of filter cloths arranged confronting each other. A recess portion for forming a filter chamber is formed at one of the confronting surfaces of the movable plate 4 and the frame 2, and a projecting portion for fitting into the recess portion so as to close the opening of the recess portion and to form the filter chamber with the recess portion is formed at the other of the surfaces thereof. In this case, the movable plate 4 approaches the frame 2, so that the chamber is formed between the pair of the cloths arranged between the recess portion and the projecting portion, with the result that the liquid is fed into the chamber and the movable plate 4 pushes the frame 2 to perform the expressing filtration.

Thought the first and second valves 64 and 62 of the air close cylinders 10 and 7 are moved into either the opening or closing position after the opening or closing operation, the valves 64 and 62 may be moved into the center valve positions.

The press may be constructed a s follows. That is, three movable plates are arranged such that a recess portion for forming a filter chamber is formed at one of the confronting surfaces of the adjacent plates and a projecting portion is defined at the other surfaces for fitting into the recess portion so as to close the opening of the recess portion and to form the chamber with the recess portion. Then, the chamber is formed between a pair of filter cloths arranged between the recess portion and the projecting portion. In this case, the movable plates are driven to approach or move away from a frame by a driving means such as a hydraulic cylinder, and a rubber tube accommodated fluid is arranged between the adjacent movable plates and between the plate and the frame so as to seal therebetween. The fluid pressure in the tube is measured by a pressure gage to measure the expressing pressure of a liquid to be fed into the chamber, with the result that the same control as the embodiments described above is performed.

By the filtration method according to the embodiment, though the increment $\delta$ in each increasing process is the same value, the pressure may be increased by an increment of any value in each increasing process. Similarly, though the first specified period $T_1$ is the same value in the maintaining process of the embodiments, any specified period may be used in each maintaining process.

Moreover, at the step S11, when it is judged that the pressure in the liquid has reached the specified value, the cake 49 is forced to fall down from the medium 1 after the maintaining process in which the pressure of the specified value is maintained only during the second period. That is, the filtration operation is terminated after each cycle in both the increasing and maintaining processes is repeated at specified times. However, when it is judged that the pressure has reached the specified value, the cake 49 may be forced to fall down from the medium 1 without the last maintaining process.

In the embodiment, when it is judged that the pressure has increased by the specified increment $\delta$ at the step S9, the drive of the motor 65 is stopped at the same time as the third and fourth valves 63 are changed at the step S10. However, these change operations of the valves 63 are first performed, and then the operation for measuring the specified period set by a timer and required to completely change the valves 63 is performed.

before the drive of the motor 65 may be stopped. In this way, during the change of the two valves after the drive stop of the motor 65, movement of the movable plate 4 away from the frame 2 which would cause lowering of the pressure is prevented.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A filter press comprising:
   a filter medium having a chamber formed therein;
   a support member;
   a vibrating member comprising means for hanging said filter medium from said support member at upper, middle, and lower locations of said filter medium so as to stretch said filter medium such that said chamber is maintained therein, and means for vibrating said filter medium so as to aid in discharging cake therefrom after filtration;
   wherein said hanging means of said vibrating member comprises a plurality of springs connected between said filter medium and said support member;
   wherein said vibrating means comprises a reciprocable piston/cylinder and a means for connecting said piston/cylinder to said filter medium; and
   wherein said connecting means of said vibrating means comprises a wire connected between said piston/cylinder and the middle of said filter medium.

2. A filter press comprising:
   a fixed plate;
   a movable plate capable of moving toward and away from said fixed plate;
   a filter medium arranged between said fixed plate and said movable plate;
   a liquid feed means for feeding liquid to be filtered into a filter chamber formed by said medium at a specified position of said movable plate with respect to said fixed plate;
   a driving means for driving said movable plate to move toward and away from said fixed plate, a capacity of the chamber being reduced by moving said movable plate in a direction in which said movable plate presses against said fixed plate through said medium by driving of said driving means so as to perform expressing filtration of the liquid and to produce cake with a desired content;
   a pressure sensor arranged at one of said movable plate and said fixed plate for measuring expressing pressure in the chamber; and
   a control unit for controlling the expressing filtration of the liquid by controlling drive of said driving means on the basis of a signal outputted from said sensor,
   said unit comprising:
   a drive start means for starting to drive said driving means to move said movable plate in a direction in which said movable plate presses against said fixed plate to start an expressing pressure-increasing process for increasing the pressure of the liquid in the chamber by a specified increment;
   a first judging means for detecting an increase in the pressure by the increment in the increasing process;
   a stop means for stopping drive of said driving means when it is judged by said first judging means that the pressure has increased by the increment;
   a timer means for measuring a first specified period in an expressing pressure-maintaining process for maintaining the pressure constant, after completion of the increasing process;
   a second judging means for detecting an increase to a specified value, corresponding to the desired water content of the cake, in the pressure after either of said pressure-increasing process and said pressure-maintaining process;
   a drive restart means for restarting said driving means so as to restart the pressure-increasing process after the pressure-maintaining process when it is judged by said second judging means that the pressure has not reached the specified value; and
   a stop means for terminating the expressing filtration when it is judged by said second judging means that the pressure has reached the specified value, after the pressure-increasing process and the pressure-maintaining process have been performed at least one time.

3. A filter press as claimed in claim 2, wherein said medium is a tubular member, and said press further comprises a first close means for closing a lower opening of said medium to form a sack so as to form the chamber in a state where said movable plate is spaced from said fixed plate and for opening said lower opening, and a second close means for closing an upper opening of said medium and for opening said upper opening.

4. A filter press as claimed in claim 2, wherein said medium comprises a pair of filter cloths arranged confronting with each other, a recess portion for use in forming the chamber is formed in one of the confronting surfaces of said movable plate and said fixed plate, and a projection portion is formed on the other of the confronting surfaces of said movable plate and said fixed plate, the projection portion being fitted into the recess portion to close an opening of the recess portion so as to form the chamber between the cloths.

5. A filter press comprising:
   a fixed plate;
   a plurality of movable plates capable of moving toward and away from said fixed plate;
   a filter medium comprising a pair of filter cloths arranged between said adjacent movable plates; a recess portion being formed in one of adjacent confronting surfaces of said movable plates, and a projection portion being formed on the other of the surfaces thereof, the projection portion being filtered into the recess portion to close an opening of the recess portion so as to form a filter chamber between the cloths;
   a liquid feed means for feeding liquid to be filtered into the chamber formed by said medium at specified positions of said movable plates with respect to said fixed plate;
   a driving means for driving said movable plates to move toward and away from said fixed plate, a capacity of said chamber being reduced by moving said movable plates in a direction in which each of said movable plates presses against said fixed plate through said medium by driving of said driving means so as to perform expressing filtration of the liquid and to reduce cake with a desired water content;

a pressure sensor arranged at one of said movable plates for measuring expressing pressure in the chamber; and a control unit for controlling the expressing filtration of the liquid by controlling drive of said driving means on the basis of a signal outputted from said sensor, said unit comprising:

a drive start means for starting to drive said driving means to move said movable plates in a direction in which each of said movable plates presses against said fixed plate to start an expressing pressure-increasing process for increasing the pressure of the liquid in the chamber by a specified increment;

a first judging means for detecting an increase in the pressure by the increment in the increasing process;

a stop means for stopping said driving means when it is judged by said first judging means that the pressure has increased by the increment;

a timer means for measuring a first specified period in an expressing pressure-maintaining process for maintaining the pressure constant, after completion of the increasing process;

a second judging means for detecting an increase to a specified value, corresponding to the desired water content of the cake in the pressure after either of said pressure-increasing process and said pressure-maintaining process;

a drive restart means for restarting said driving means so as to restart the pressure-increasing process after the pressure-maintaining process when it is judged by said second judging means that the pressure has not reached the specified value; and a stop means for terminating the pressure filtration when it is judged by said second judging means that the pressure has reached the specified value, after the pressure-increasing process of the pressure-maintaining process have been performed at least one time.

* * * * *